United States Patent
Visser

(10) Patent No.: US 10,517,220 B2
(45) Date of Patent: Dec. 31, 2019

(54) WRAPPING DEVICE FOR SUPPLYING WRAPPING MATERIAL AND SUPPLYING METHOD

(71) Applicant: FORAGE INNOVATIONS B.V., Maassluis (NL)

(72) Inventor: Arend Cornelis Visser, Maassluis (NL)

(73) Assignee: Forage Company B.V., Maassluis (NL)

( * ) Notice: Subject to any disclaimer, the term of this patent is extended or adjusted under 35 U.S.C. 154(b) by 571 days.

(21) Appl. No.: 15/167,685

(22) Filed: May 27, 2016

(65) Prior Publication Data
US 2016/0345503 A1    Dec. 1, 2016

(30) Foreign Application Priority Data

May 28, 2015   (NL) ........................................ 2014872

(51) Int. Cl.
*A01F 15/07*   (2006.01)
*B65B 11/02*   (2006.01)
*B65B 41/16*   (2006.01)
*B65B 45/00*   (2006.01)

(52) U.S. Cl.
CPC .......... *A01F 15/071* (2013.01); *B65B 11/025* (2013.01); *B65B 41/16* (2013.01); *B65B 45/00* (2013.01)

(58) Field of Classification Search
CPC ......... B65B 11/04; B65B 41/12; B65B 41/16; B65B 63/04; A01F 15/071; A01F 15/0715
USPC ... 53/397, 430, 118, 168, 587, 389.1, 389.2, 53/389.4; 414/467, 911
See application file for complete search history.

(56) References Cited

U.S. PATENT DOCUMENTS

| 3,355,988 | A | * | 12/1967 | Giuliano | F41A 9/22 89/24 |
| 3,765,037 | A | * | 10/1973 | Dunkin | A61G 7/1017 198/832 |
| 3,785,468 | A | * | 1/1974 | Misenheimer | B65G 39/02 193/35 MD |
| 4,120,463 | A | * | 10/1978 | Alinder | B65H 16/028 242/527.5 |
| 4,131,206 | A | * | 12/1978 | Kawada | B65H 19/126 242/559.4 |
| 4,135,433 | A | * | 1/1979 | Hultgren | F41A 9/42 89/47 |

(Continued)

FOREIGN PATENT DOCUMENTS

| EP | 0 865 721 B1 | 1/2005 |
| EP | 1 602 270 A1 | 12/2005 |

(Continued)

*Primary Examiner* — Alexander M Valvis
*Assistant Examiner* — Daniel Jeremy Leeds

(57) ABSTRACT

A wrapping device and a web supplying method are used on board of an agricultural harvester. A supply reel with wrapping material is held between two parts of an unrolling station. A web moving member moves a web taken from this supply reel away from the unrolling station. For replacing the supply reel with a further supply reel, the further supply reel is placed on at least one supporting roller. The or every supporting roller is stationary and is positioned angularly below the unrolling station and between two unrolling station parts. The further supply reel on the supporting roller is shifted in a shifting direction towards an unrolling station part.

19 Claims, 12 Drawing Sheets

(56) References Cited

U.S. PATENT DOCUMENTS

| | | | | |
|---|---|---|---|---|
| 4,265,411 A * | 5/1981 | Fasolak | B65H 16/06 | 242/559.4 |
| 4,598,534 A * | 7/1986 | Rosenthal | B65B 11/045 | 53/211 |
| 4,662,151 A * | 5/1987 | Mathes | A01F 15/071 | 53/118 |
| 4,685,270 A * | 8/1987 | Brambilla | A01F 15/071 | 53/176 |
| 4,691,503 A * | 9/1987 | Frerich | A01F 15/0715 | 53/587 |
| 4,821,486 A * | 4/1989 | Oiestad | A01F 15/071 | 53/170 |
| 4,995,216 A | 2/1991 | Vansteelant | | |
| 5,181,368 A | 1/1993 | Anstey et al. | | |
| 5,477,955 A * | 12/1995 | Madden | B07B 13/16 | 198/370.04 |
| 5,505,401 A * | 4/1996 | Lamothe | B65H 16/106 | 242/412.2 |
| 5,740,662 A * | 4/1998 | Royneberg | A01F 15/071 | 53/211 |
| 5,811,721 A * | 9/1998 | Andersson | F41A 9/16 | 89/33.01 |
| 5,996,307 A * | 12/1999 | Niemerg | A01F 15/0715 | 53/118 |
| 6,357,991 B1 * | 3/2002 | Hamlett | B60P 3/1058 | 414/462 |
| 6,591,733 B1 * | 7/2003 | Engstrom | F41A 9/16 | 89/33.05 |
| 6,595,455 B2 * | 7/2003 | Romes | B65H 16/08 | 242/422.5 |
| 6,971,220 B1 * | 12/2005 | Rampp | A01F 15/071 | 53/216 |
| 7,067,833 B2 * | 6/2006 | Ramm | A01F 15/071 | 242/420.3 |
| 7,082,740 B2 * | 8/2006 | van der Lely | A01F 15/071 | 53/135.1 |
| 7,546,971 B2 * | 6/2009 | Pappas | B65H 19/123 | 242/533.7 |
| 7,815,032 B2 * | 10/2010 | Preston | E21B 19/15 | 198/369.3 |
| 8,523,451 B2 * | 9/2013 | Ozu | F16C 19/26 | 384/551 |
| 8,544,241 B2 * | 10/2013 | Reijersen-Van Buuren | A01F 15/071 | 53/211 |
| 8,887,782 B2 * | 11/2014 | Bessette | B29C 63/0065 | 156/497 |
| 8,919,085 B2 * | 12/2014 | Smith | A01F 15/0715 | 53/389.4 |
| 8,925,287 B2 * | 1/2015 | Derscheid | A01F 15/0715 | 53/168 |
| 9,237,691 B2 * | 1/2016 | McHale | A01F 15/071 | |
| 9,320,199 B2 * | 4/2016 | Smith | A01F 15/0715 | |
| 9,415,888 B2 * | 8/2016 | Smith | A01F 15/0715 | |
| 9,609,809 B2 * | 4/2017 | Reijersen Van Buuren | A01F 15/071 | |
| 9,731,921 B2 * | 8/2017 | Howard | B65H 75/185 | |
| 9,970,195 B1 * | 5/2018 | Vasquez | E04D 15/06 | |
| 2002/0124529 A1 * | 9/2002 | van der Lely | A01F 15/071 | 53/411 |
| 2003/0089864 A1 * | 5/2003 | Ramm | A01F 15/071 | 250/559.42 |
| 2003/0133781 A1 * | 7/2003 | Lehrieder | B65G 1/04 | 414/278 |
| 2003/0140776 A1 * | 7/2003 | Domeij | F41A 9/16 | 89/47 |
| 2004/0221547 A1 * | 11/2004 | Anstey | A01F 15/0715 | 53/399 |
| 2004/0250704 A1 * | 12/2004 | Viaud | A01F 15/0715 | 100/88 |
| 2005/0022659 A1 * | 2/2005 | Domeij | F41A 9/16 | 89/45 |
| 2007/0039664 A1 * | 2/2007 | Quick | B27B 31/003 | 144/356 |
| 2007/0081878 A1 * | 4/2007 | McHale | A01F 15/071 | 414/24.5 |
| 2008/0034984 A1 * | 2/2008 | Olander | A01F 15/12 | 100/4 |
| 2008/0264031 A1 * | 10/2008 | McHale | A01F 15/071 | 56/341 |
| 2009/0116948 A1 * | 5/2009 | Keller | B65H 19/126 | 414/754 |
| 2011/0215187 A1 * | 9/2011 | Owurowa | A47K 10/22 | 242/550 |
| 2012/0090274 A1 * | 4/2012 | Reijersen Van Buuren | A01F 15/071 | 53/461 |
| 2012/0137630 A1 * | 6/2012 | McHale | A01F 15/071 | 53/167 |
| 2013/0284565 A1 * | 10/2013 | Kuiper | B65G 15/64 | 198/617 |
| 2015/0008276 A1 * | 1/2015 | Hofer | B21C 47/3425 | 242/534.1 |
| 2015/0033666 A1 * | 2/2015 | Ravaglia | A01F 15/0715 | 53/137.2 |
| 2015/0068181 A1 * | 3/2015 | Horstmann | A01F 15/0705 | 56/131 |
| 2015/0124016 A1 * | 5/2015 | Bildstein | B65H 23/038 | 347/16 |
| 2015/0195994 A1 * | 7/2015 | Ostermann | A01F 15/0715 | 100/3 |
| 2015/0216375 A1 * | 8/2015 | Okazaki | A47K 10/38 | 242/596.4 |
| 2015/0245563 A1 * | 9/2015 | Heaney | A01F 15/071 | 53/52 |
| 2015/0305244 A1 * | 10/2015 | Gresset | A01F 15/0715 | 53/587 |
| 2015/0344088 A1 * | 12/2015 | Hakes | B62D 55/14 | 305/137 |
| 2015/0373917 A1 * | 12/2015 | Reijersen Van Buuren | A01F 15/0715 | 53/399 |
| 2016/0037725 A1 * | 2/2016 | Gresset | A01F 15/0715 | 53/582 |
| 2016/0088797 A1 * | 3/2016 | De Baere | A01F 15/0715 | 53/399 |
| 2016/0100527 A1 * | 4/2016 | McHale | A01F 15/071 | 53/167 |
| 2016/0113204 A1 * | 4/2016 | Rosseel | A01F 15/0715 | 53/167 |
| 2016/0183474 A1 * | 6/2016 | Thoreson | A01F 15/0715 | 53/399 |
| 2016/0235007 A1 * | 8/2016 | Hoffmann | A01F 15/085 | |
| 2017/0205744 A1 * | 7/2017 | Tanaka | G03G 15/2017 | |

FOREIGN PATENT DOCUMENTS

| | | |
|---|---|---|
| EP | 1 129 611 B1 | 7/2008 |
| EP | 1 121 850 B1 | 4/2009 |
| EP | 1 602 269 B1 | 12/2009 |
| WO | WO 00/16607 A1 | 3/2000 |

\* cited by examiner

WRAPPING DEVICE FOR SUPPLYING WRAPPING MATERIAL AND SUPPLYING METHOD

FIELD OF THE INVENTION

The invention refers to a wrapping device for supplying web on board of an agricultural harvester and to a method for supplying a web of wrapping material by using such a wrapping device, in particular to supplying wrapping material which is used for wrapping in a drum-shaped bale forming chamber a round-cylindrical bale made from agricultural crop material.

BACKGROUND OF THE INVENTION

The invention can be used on board of a bale forming apparatus. A bale forming apparatus for agricultural or recycling purposes injects loose material into a drum-shaped bale forming chamber and forms under pressure from the injected loose material in the bale forming chamber a round-cylindrical bale. Such an apparatus is also called a round baler. Before ejecting the bale at least the circumferential bale surface must be wrapped into a web of wrapping material (a net or plastic sheet, e.g.). Otherwise the bale would fall apart after being ejected.

For wrapping the bale the web of wrapping material is taken from a supply reel with wrapping material. The web is injected into the bale forming chamber and is clamped by the rotated bale to be wrapped and by a bale forming means surrounding the bale forming chamber. The clamped wrap is pulled from the supply reel. The supply reel is held by an unrolling station while the bale is formed and while the web is pulled from the unrolling station.

After wrapping several bales the supply reel will get empty. An empty supply reel in the unrolling station has to be replaced with a new one. In general the human operator performs this replacement. The problem occurs that a full supply reel has to be placed in the unrolling station in a proper operating position in which wrapping material can be pulled from it and that the full supply reel may have a weight of several dozen kilograms. Often this replacement is performed outside of a workshop, e.g. on an agricultural field, such that no lifting device is available. Therefore a human operator has to manually move and adjust the new supply reel. Several suggestions for loading devices which support the human operator in moving the new supply reel to the unloading device were made.

EP 0865721 B1 and U.S. Pat. No. 5,996,307 disclose a round baler which injects a web (Mantelbahn 5) through a nip (Einlassspalt) into a bale forming chamber (Pressraum 2), cf. FIG. 1. FIG. 3 and FIG. 4 show one embodiment how a new supply reel with wrapping material (Ersatzrolle 14') is supplied to an unrolling station. The new supply reel 14' is placed and temporarily fixed on a trough (Rinne 12') by means of two connecting members in the form of straps (Bandagen 15', 16'). The trough 12' with the supply reel 14' can be rotated around a vertical lateral axle 9' and around a horizontal axis 21 parallel to the travelling direction. A piston-cylinder unit (Kolbenzylindereinheit 23) is connected with the axle 9' and with the trough 12' and can rotate the trough 12' from a sloping position (continuous lines) into an approximately horizontal position (dotted lines, cf. FIG. 3). The new supply reel 12 rests on rollers (Rollen 26, 27) mounted in the bottom of the trough 12' and can be shifted over these rollers 26, 27 towards the unloading device (Abrollstation AS).

FIG. 5 of EP 1602269 B1 shows an round baler with an unrolling station (Abrollstation 89) and with a loading device for a reserve supply reel (Vorrats-Materialbahnrolle 88), cf. par. [0027]. The reserve supply reel 88 rests on a trough (Lademulde 92). This trough 92 carrying the supply reel 88 can be pivoted around a vertical axis 90 and a horizontal axis 91. A bottom conveyer 93 can shift the supply reel 88 in a horizontal direction. In addition a piston-cylinder device (Hydrozylinder 98) can pivot the trough 92 from a sloping position (dotted lines) into a horizontal position (continuous lines).

EP 1602270 B1 discloses a round baler with an unrolling station (Abrollstation 16) and with a supply station (Vorratsstation 21), each carrying a supply reel with wrapping material. For wrapping a bale in the pressing chamber a web of wrapping material is pulled from the reel kept in the unrolling station 16. If this active reel is empty, it is replaced by a new reel 22 stored in the supply station 21. The new reel 22 is inserted from the side into a pivotal loading device (Ladeeinrichtung 30). This loading device 30 with the new reel 22 is pivoted towards the unrolling station 16.

EP 1121850 B1 and EP 1129611 B1 disclose a round baler with an unrolling station (Abrollstation 13) for a wrapping material reel (Materialbahnrolle 14). A loading device (Ladeeinrichtung 18) comprises a frame and carries a new reel 14. This loading device 18 is moved to the baler. In one embodiment the loading device 18 has wheels. A human operator pulls the loading device 18 like a trolley over ground. The loading device 18 is laterally inserted by shifting it onto guiding elements (Führungen 19). These guiding elements 19 guide the loading device 18 in a direction perpendicular to the travelling direction. The guiding elements 19 have a trapezoidal cross section and are rigidly mounted at the front housing.

FIG. 3 of WO 00/16607 A1 shows a holder for carrying a roll 4 of film material 3. The roll 4 is kept between two conical bearings 25, cf. p. 12. The roll 4 is kept in a vertical position, i.e. the axis of the roll 4 is vertical. The lower conical bearing 25 is kept by a lower support arm 18. An upper support arm 21 carries the upper conical bearing 25. Both support arms 18, 21 are mounted at a support member 17. A gusset plate 23 reinforces the mounting of the upper support arm 21 at the support member 17. A spring 30 biases a spigot 22 carrying the upper conical bearing 25 downwards towards the lower conical bearing 25.

SUMMARY OF THE INVENTION

A problem solved by the invention is to provide a wrapping device for use on an agricultural harvester with the features of the preamble of claim 1 and a web supplying method with the features of the preamble of claim 23 wherein the loading device does not require a pivotal trough or frame for the further supply reel and nevertheless enables ergonomic work for a human operator who has to provide the further supply reel to the unrolling station by using the loading device.

This problem is solved by a wrapping device with the features of claim 1 and by a web supplying method with the features of claim 23. Preferred embodiments are specified in the depending claims.

The wrapping device according to the invention is used on board of an agricultural harvester and comprises
  an unrolling station,
  a web moving member, and
  a loading device.

The unrolling station comprises
a receiving unrolling station part and
a further unrolling station part.

The loading device comprises at least one supporting roller. The or every supporting roller of the loading device is positioned angularly below the unrolling station. The or every supporting roller is mounted in a position or can be transferred into a position between the two unrolling station parts—more precisely: between two ideal parallel vertical planes running through the unrolling station parts.

The unrolling station can selectively be operated
in a holding mode and
in a releasing mode.

The unrolling station being in the holding mode holds a supply reel with wrapping material by means of the two unrolling station parts and enables a rotation of this supply reel with respect to the unrolling station around a reel center axis. When the supply reel is kept by both unrolling station parts, the reel center axis is horizontal. A vertical distance between the or every supporting roller and a supply reel held by the unrolling station operated in the holding mode occurs.

The web moving member can move a web of wrapping material taken from the supply reel while the supply reel is held by the unrolling station. The web moving member moves the web away from the unrolling station and towards a wrapping material inlet which guides into a chamber containing an object to be wrapped.

The unrolling station being in the releasing mode releases the supply reel and enables a removal of the supply reel out of the unrolling station and the insertion of a further (new) supply reel into the unrolling station.

The loading device is arranged for carrying a further supply reel. The or every supporting roller can carry from below the further supply reel and enables that the further supply reel resting on the or at least one supporting roller is shifted in a shifting direction. This shifting direction is parallel to the reel center axis of the further supply reel. The respective rotating axis of the or every supporting roller of the loading device is perpendicular to the shifting direction.

The wrapping device according to the invention is adapted to be operated as follows and the web supplying method according to the invention comprises the following steps:

The unrolling station being in the holding mode holds a supply reel such that the supply reel can rotate around the reel center axis. This reel center axis is horizontal while the supply reel is held by the unrolling station.

The web moving member moves a web of wrapping material taken from the supply reel away from the unrolling station. This web is taken from the supply reel while the supply reel is held in the unrolling station.

For replacing the supply reel held by the unrolling station with a further supply reel, the wrapping apparatus is further adapted as follows and the following further steps are performed:

The unrolling station is transferred into the releasing mode and releases the (old) supply reel.

The (old) supply reel is removed from the unrolling station.

The further supply reel is positioned on the or at least one supporting roller.

Thereby the further supply reel is supported from below by the loading device.

The further supply reel is shifted over the supporting roller(s) in the shifting direction and towards the receiving unrolling station part. This shifting direction is parallel to the reel center axis of the further supply reel.

The shifted further supply reel is inserted into the unrolling station and held at least by the receiving unrolling station part.

The unrolling station is transferred into: the holding mode. Both unrolling station parts now carry the further supply reel.

Advantages

For replacing an old supply reel with a new one the new supply reel is placed onto the supporting roller or onto at least one of the plurality of supporting rollers. The or every supporting roller is positioned angularly below the unrolling station. Thanks to the invention the supporting rollers are mounted in or can be transferred into a position at an ergonomic height regardless of the height at which the unrolling station for the supply reel is positioned. An operator only needs to transfer a new supply reel onto the or at least one supporting roller but not in one step to the unrolling station or on a carrier arranged in the height of the unrolling station. Later the operator can move the supply reel from the loading device into the unrolling station. Thanks to the supporting roller(s) the operator has to lift the new supply reel only over a shorter vertical distance into the unrolling station—compared with a wrapping device without comprising such supporting rollers.

Thanks to the invention the loading device does not require a pivotal trough. Pivoting such a trough requires space and an actuator or manual effort. A pivotal lateral trough may increase the width of the harvester comprising the wrapping device. A pivotal trough requires more mechanical parts. As the or every supporting roller is positioned between the two unrolling station parts, the loading device according to the invention does not increase the width of the wrapping device and thereby the width of the agricultural harvester.

Thanks to the invention a simple mechanical construction can be achieved. The invention does not require an additional part—additional to the web moving member—which is actively driven. It suffices that the or every supporting roller is a passive idler roller or can manually be shifted or pivoted.

Thanks to the invention it is easier to mount the or every supporting roller at the harvester. It is possible to mount the or every supporting roller at a wall of the harvester, e.g. at the front wall or rear wall seen in the travelling direction. A lateral part at which the or every supporting roller is to be mounted is not needed.

According to the invention the new supply reel is placed on the supporting roller or on at least one of the plurality of supporting rollers and is shifted in the shifting direction. The or every supporting roller can rotate around a respective roller rotating axis perpendicular to the shifting direction. Therefore the risk is excluded that the new supply reel is damaged while being shifted in the shifting direction. This risk would occur if the new supply reel were shifted over a frame or trough without rollers. In particular the circumferential surface of the supply reel could be scratched by the frame or trough while the supply reel is shifted.

According to the invention a vertical distance between the supply reel held by the unrolling station and the or every supporting roller occurs. Thereby the supply reel in the unrolling station can rotate without being contacted by the or one supporting roller. The risk is reduced that debris between the rotating supply reel and the or one supporting roller causes a jam.

According to the invention the or every supporting roller is mounted in or can be transferred into a position in which it does not impede or even inhibit a rotation of a supply reel which is kept between and by the unrolling station parts. To achieve this goal the or every stationary supporting roller is mounted such that the following feature is fulfilled: The minimal distance between the center axis of a supply reel held by the unrolling station and the or every supporting roller is larger than the maximal radius of the further supply reel.

PREFERRED EMBODIMENTS

In one embodiment the loading device comprises exactly one supporting roller which is preferably positioned substantially in the middle between the two unrolling station parts. In an alternative embodiment the loading device comprises a plurality of at least two supporting rollers. The further supply reel is jointly carried by the plurality of supporting rollers.

In one embodiment the respective roller rotating axis of a supporting roller is horizontal—at least when a new supply reel on the supporting roller is shifted in the shifting direction. Preferably this horizontal roller rotating axis is parallel to the longitudinal axis of the harvester.

In one embodiment the or every supporting roller can rotate in both rotating directions around the respective rotating axis. In a further embodiment at least one supporting roller can only rotate in one rotating direction whereas the rotation in the other rotating direction is inhibited. Therefore a supply reel resting on the supporting roller can be moved in the shifting direction but not in the opposite direction. This feature is preferably achieved by means of a free-wheel clutch. Preferably a roller body of the supporting roller can rotate in one rotating direction around a roller axle. The free-wheel clutch is mounted on the axle and is in the interior of the roller body. The free-wheel clutch is arranged such that the supporting roller enables a shift of the further supply reel in the shifting direction towards the receiving unrolling station part but inhibits a movement in the opposite direction.

The embodiment with the free-wheel clutch or a further device which inhibits the rotation and the other rotating direction is in particular of advantage if the shifting direction is sloping upwards. Without a free-wheel clutch the force of gravity could move the sloping further supply reel downwards opposite to the shifting direction which is an undesired event. A shifting direction sloping upwards can in particular occur in the following situations:
  The wrapping device is operated on a hilly ground, e.g. as a part of a vehicle which moves over ground and is tilted.
  The further supply reel is supported by only one supporting roller and rests in an upwardly sloping direction on it.
  The wrapping device comprises two supporting rollers and the supporting roller adjacent to the further unrolling station part has a lower distance to the ground than the supporting roller adjacent to the receiving unrolling station part.

In one embodiment the or every supporting roller is implemented as an idler roller. Shifting the further supply reel in the shifting direction causes the or every idler supporting roller to rotate around the respective roller rotating axis. In a further embodiment a roller drive can selectively be activated or deactivated. The activated roller drive can rotate the or at least one supporting roller such that the rotated supporting roller shifts the further supply reel in the shifting direction. This drive can support the operator to shift the further supply reel towards the receiving unrolling station part.

Preferably a first gap occurs between the unrolling station part and the or the adjacent supporting roller. A second gap occurs between the further station part and the or the adjacent supporting roller. In the case of at least two supporting rollers preferably an intermediate gap between two adjacent supporting rollers occurs. Thanks to the gaps it is possible to carry a further supply reel through these gaps before placing the reel on the or one supporting roller. In addition debris may drop through the gaps on the ground.

In one embodiment the or at least one supporting roller has a circumferential surface made of rubber or plastic. A high friction force between the circumferential surface of the supporting roller and the circumferential surface of the supply reel resting on the or one supporting roller occurs. This high friction force reduces the risk of an undesired movement of the supply reel on the supporting rollers, e.g. opposite to the shifting direction. This embodiment can be combined with the free-wheel clutch. In addition a surface made of rubber or plastic is elastic and reduces the wear applied to the supporting roller and thereby the risk of a damage.

The or every supporting roller can have a cylindrical shape. In an alternative embodiment the or at least one supporting roller has a concave circumferential surface. This concave surface occurs in a viewing direction parallel to the shifting direction, i.e. perpendicular to the roller's rotating axis. This embodiment reduces the risk that the following undesired event occurs: The further supply reel on the or on every supporting roller moves in a direction perpendicular or angular to the shifting direction and drops from the or from one supporting rollers onto the ground. This undesired event can in particular occur when the longitudinal axis of the harvester slops downwardly—seen in the travelling direction.

In general a supply reel has a round-cylindrical shape. In one embodiment the concave surface has a cross section with a plane perpendicular to the roller rotating axis wherein the cross section comprises two circular or elliptic or otherwise curved segments. The supply reel rests on the upper surface segment. The minimal radius of every segment is preferably equal to or larger than the radius of the supply reel but at the most 20% larger. This embodiment provides a large contact surface between the circumferential surface of the supply reel and the concave circumferential surface of the supporting roller. If the roller radius is equal to or only slightly larger, the force of gravity aligns the supply reel in a centered position with respect to the supporting roller.

According to one embodiment of the invention the or every supporting roller is stationary, i.e. can only rotate around its own rotating axis. This embodiment enables a robust mechanical construction.

In an alternative embodiment the or at least one supporting roller can pivot around a roller pivoting axis which is perpendicular to the shifting direction and therefore perpendicular to the reel center axis. This alternative embodiment enables an even more ergonomic operation: The operator can place a supply reel on the pivotal supporting roller and can pivot the supply reel together with the supporting roller into a position in which the supply reel can be shifted in the shifting direction towards the receiving unrolling station part. It is possible that a supporting roller adjacent to the receiving unrolling station part is pivotal and a further supporting roller is stationary. The roller pivoting axis can be horizontal or vertical. It is possible that the supporting roller can be pivoted around two roller pivoting axes which are perpendicular to each other and perpendicular to the shifting direction.

In one embodiment the respective rotating axis of the or every supporting roller is stationary. In a further embodiment the rotating axis can be pivoted around an axis which is perpendicular to the shifting direction and therefore perpendicular to the reel center axis. Preferably the roller rotating axis is horizontal. Thanks to this pivotal rotating axis the or every supporting roller can be pivoted between a receiving position and an inserting position. In one implementation the respective distance between the or every supporting roller being in the receiving position and the ground is smaller than this distance when the supporting roller is in the inserting position. In a further implementation an arcuate angle occurs between the supporting roller being in the receiving position and the center axis of a supply reel held by the unrolling station being in the holding mode.

This embodiment enables an operator to place a new supply reel on the or every supporting roller being in the receiving position. The or every supporting roller carrying the further supply reel is pivoted upwards around the preferably horizontal roller pivoting axis from the receiving position into the inserting position. Now the further supply reel is shifted in the shifting direction and is inserted into the unrolling station. Thanks to the lowered receiving position it is even more ergonomic to place a further supply reel on the or at least one supporting roller.

In one implementation a pivotal frame carries the or every supporting roller. A roller axle of a supporting roller is rigidly connected with this pivotal frame. A roller body of the supporting roller can rotate around this rigidly mounted roller axle. The frame carries the or every supporting roller. The frame together with the or every supporting roller can be pivoted between the receiving position and the inserting position.

Preferably the or every supporting roller comprises a stationary roller axle and a rotatable roller body. In one embodiment the roller body can be shifted with respect to the roller axle in two opposing directions both parallel to the roller rotating axis. Thereby the roller body can be moved away from the unrolling station and away from a wrapping material inlet into a remote position. Placing a further supply reel is often easier with the or every roller body being in the remote position.

In one embodiment the unrolling station comprises
a moveable holding member belonging to the further unrolling station part and
a receiving holding member belonging to the receiving unrolling station part.

The moveable holding member can be moved, e.g. shifted, between
a holding position and
a remote position.

The supply reel with wrapping material is jointly held by
the moveable holding member being in the holding position and
the receiving holding member.

When the moveable holding member is in the remote position, the distance between the two holding members is sufficiently large and the supply reel can be removed from the unrolling station. When the further supply reel is shifted in the shifting direction, it is shifted towards the receiving holding member.

In one embodiment the receiving holding member is stationary, e.g. can only rotate around its own rotational axis or not at all with respect to the unrolling station. In a further embodiment the receiving holding member can be pivoted between
a holding position and
a receiving position.

The receiving holding member being in the holding position and the moveable holding member being in the holding position jointly carry the supply reel. Preferably a locking device locks the receiving holding member and/or the moveable holding member in the respective holding position.

For inserting the further supply reel, the receiving holding member can be pivoted in the receiving position and the moveable holding member can be moved into the remote position. These positions make it easier to place the further supply reel in the unrolling station. The shifting direction can be angularly towards the pivoted receiving holding member.

The pivoting axis of the receiving holding member can in particular be vertical or horizontal. The receiving holding member with a vertical pivoting axis enables an operator to insert the further supply reel from a larger distance.

The shaft stub can be stationary or pivotal. In one embodiment the receiving holding member comprises a shaft stub. This shaft stub engages into a hollow kernel of a supply reel kept by the unrolling station. In one implementation the shaft stub comprises a conical end portion which points towards the supply reel. This implementation makes it easier to arrange and position the supply reel in a coaxial position with respect to the shaft stub.

In a further embodiment the receiving unrolling station part comprises a pivotal rod. The rod being in the holding mode keeps the supply reel. In one implementation the rod is guided through a hollow kernel of the supply reel. The further unrolling station part locks the rod. In order to replace a supply reel with a new supply reel, the rod can be released and pivoted away from the further unrolling station part. The hold supply reel can be removed from the rod.

According to the invention the or every supporting roller has a respective roller rotating axis which is perpendicular to the shifting direction. The unrolling station holds the supply reel such that the supply reel can rotate around the reel center axis. In one embodiment the or every roller rotating axis is perpendicular to the reel center axis. Thereby the shifting direction is parallel to the reel center axis of the supply reel being held by the unrolling station. In a further embodiment an arcuate angle occurs between the shifting direction for the further supply reel and the reel center axis being held by the unrolling station. This embodiment enables a more economic work as the operator can insert the further supply reel from a larger distance to the unrolling station.

According to the invention the web moving member moves a web of wrapping material away from a supply reel held in the unrolling station. In one embodiment the web moving member comprises two clamping elements which clamp the web of wrapping material between them and pull the clamped web from the supply reel held by the unrolling station. The two clamping elements can comprise two pulling rollers wherein one pulling roller is biased against the other pulling roller and wherein at least one pulling roller is driven. In a further embodiment the clamping elements belong to a duckbill—like web moving member with two yaws. In an alternative embodiment a pusher pushes a loose end of the web away from the unrolling station. In yet an alternative embodiment a pressing member presses the web against a moved bale forming means, e.g. against the outer surface of a driven pressing belt.

In one embodiment a human operator places the new supply reel on the loading device. In an alternative embodiment a manipulator places the new supply reel on the loading device. The manipulator can work fully automatically or can be steered or controlled by a human operator. Thanks to the supporting rollers it is easier to place the new supply reel on the loading device. The manipulator can easier recognize the position of the supporting rollers, e.g. by computer vision.

In one embodiment the wrapping device is used on board of an agricultural vehicle. This vehicle can be self-propelled or moved by a further vehicle and operates as a harvester. The harvester performs the following steps:
  injects loose crop material into a bale forming chamber,
  forms from the injected loose crop material under pressure a bale,
  supplies a web of wrapping material by using a wrapping apparatus according to the invention,
  injects the supplied web through a horizontal wrapping material inlet into the bale forming chamber,
  wraps at least one surface of the bale in the bale forming chamber into the injected web, and
  ejects the wrapped bale.

Preferably the harvester is moved over ground and picks up loose material from the ground while being moved over ground. When the supply reel is held by the unrolling station, its reel center axis is perpendicular to the travelling direction.

The web of wrapping material is pulled from a supply reel and is injected into the bale forming chamber. The supply reel is kept by a wrapping device according to the embodiment.

These and other aspects of the invention and of the preferred embodiment will be even more apparent from the detailed embodiment as described below and will be elucidated in detail there.

DETAILED DESCRIPTION OF EMBODIMENT

In the embodiments described below the invention is used on board of a round baler which forms under pressure from loose agricultural material a sequence of round-cylindrical bales in a drum-shaped bale forming chamber and wraps the circumferential surfaces of these bales in the bale forming chamber into wrapping material (a net or plastic sheet, e.g.).

During operation the baler is pulled over ground in a travelling direction TD (in FIG. 1, FIG. 3, FIG. 9, and FIG. 10 pointing to the observer, in FIG. 2, FIG. 5, FIG. 7, and FIG. 8 from right to left, in FIG. 4, FIG. 6, FIG. 11, and FIG. 12 from bottom to top). The baler
  picks up loose crop material from the ground,
  conveys the picked-up crop material in a direction opposite (anti-parallel) to the travelling direction TD into the bale forming chamber,
  forms in the bale forming chamber under pressure a round-cylindrical bale from the injected crop material,
  injects a wrap of wrapping material (a net or plastic sheet, e.g.) through a horizontal wrapping material inlet into the bale forming chamber,
  wraps the circumferential surface of the bale into the injected web of wrapping material,
  severs the web at a severing location outside of the bale forming chamber, and
  ejects the wrapped bale out of the bale forming chamber.

The wrapped bale is deposited on the ground or on the wrapping table of a wrapper which wraps outside of the bale forming chamber the entire surface of the bale into plastic film. The baler performs this sequence several times.

The bale forming chamber is surrounded by a stationary front housing and a pivotally mounted tailgate. For ejecting the wrapped bale the tailgate is pivoted away from the stationary front housing.

In the embodiment the wrapping material is pulled from a round-cylindrical supply reel while this supply reel is kept by an unrolling station which is positioned in front of the bale forming chamber—seen in the travelling direction TD of the baler. The unrolling station is mounted at the front housing. It is also possible to pull the wrapping material from a supply reel positioned at the tailgate. In this case the unrolling station holding the supply reel is mounted at the tailgate.

In both embodiments the center axis of the supply reel kept by the unrolling station is perpendicular to the travelling direction TD and parallel to the center axis of the bale to be wrapped, i.e. horizontal. A web moving member conveys the web in a direction perpendicular to the reel center axis towards the horizontal wrapping material inlet guiding into the drum-shaped bale forming chamber. During operation the supply reel is rotatably kept such that the center axis of the round-cylindrical supply reel extends in a horizontal direction parallel to the ground and perpendicular to the travelling direction TD.

Figure 1:
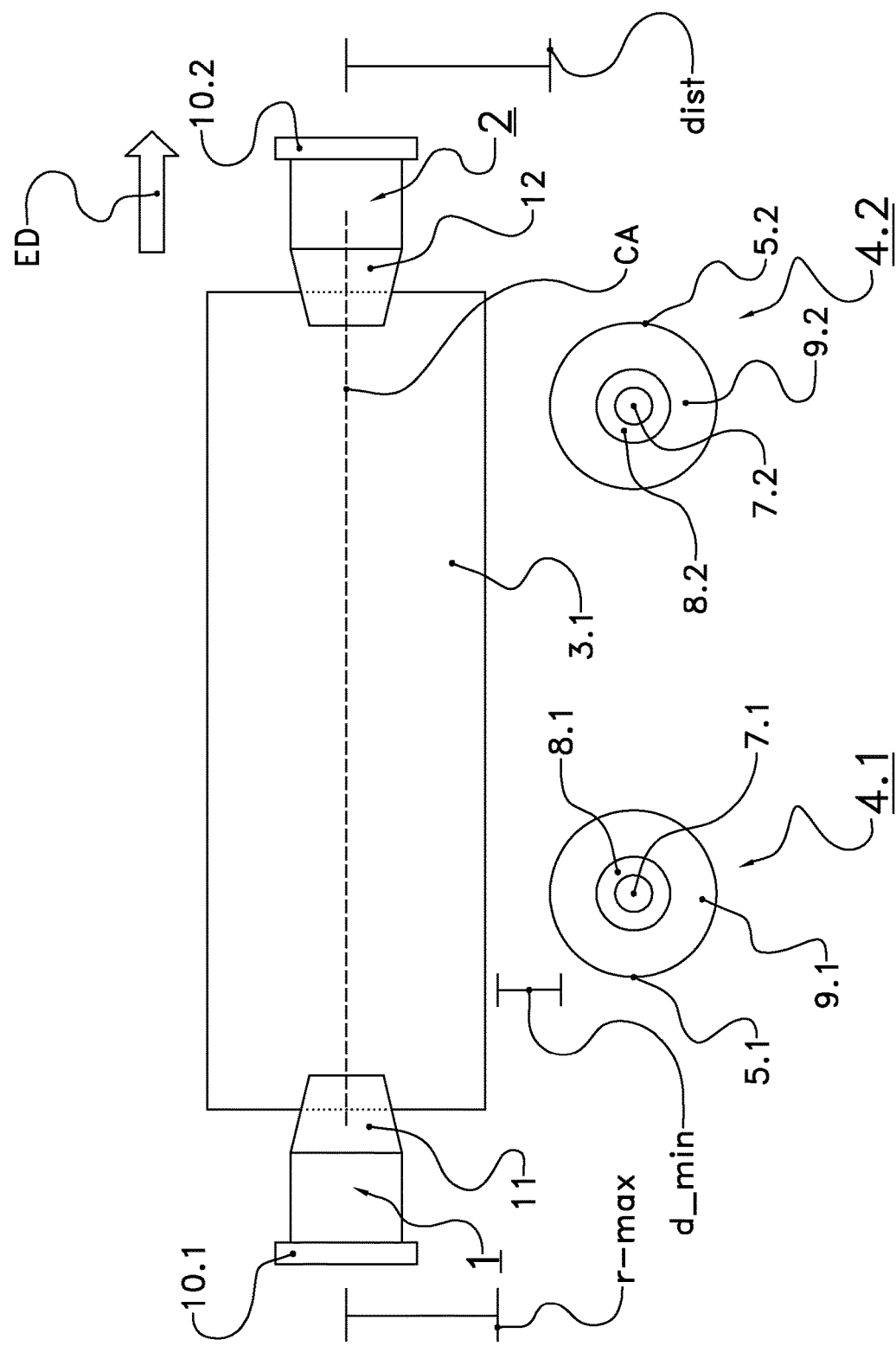
FIG. 1 shows in a horizontal viewing direction opposite (anti-parallel) to the baler's travelling direction the wrapping device with a supply reel kept by the unrolling station and with a first embodiment of the loading device.
Figure 2:
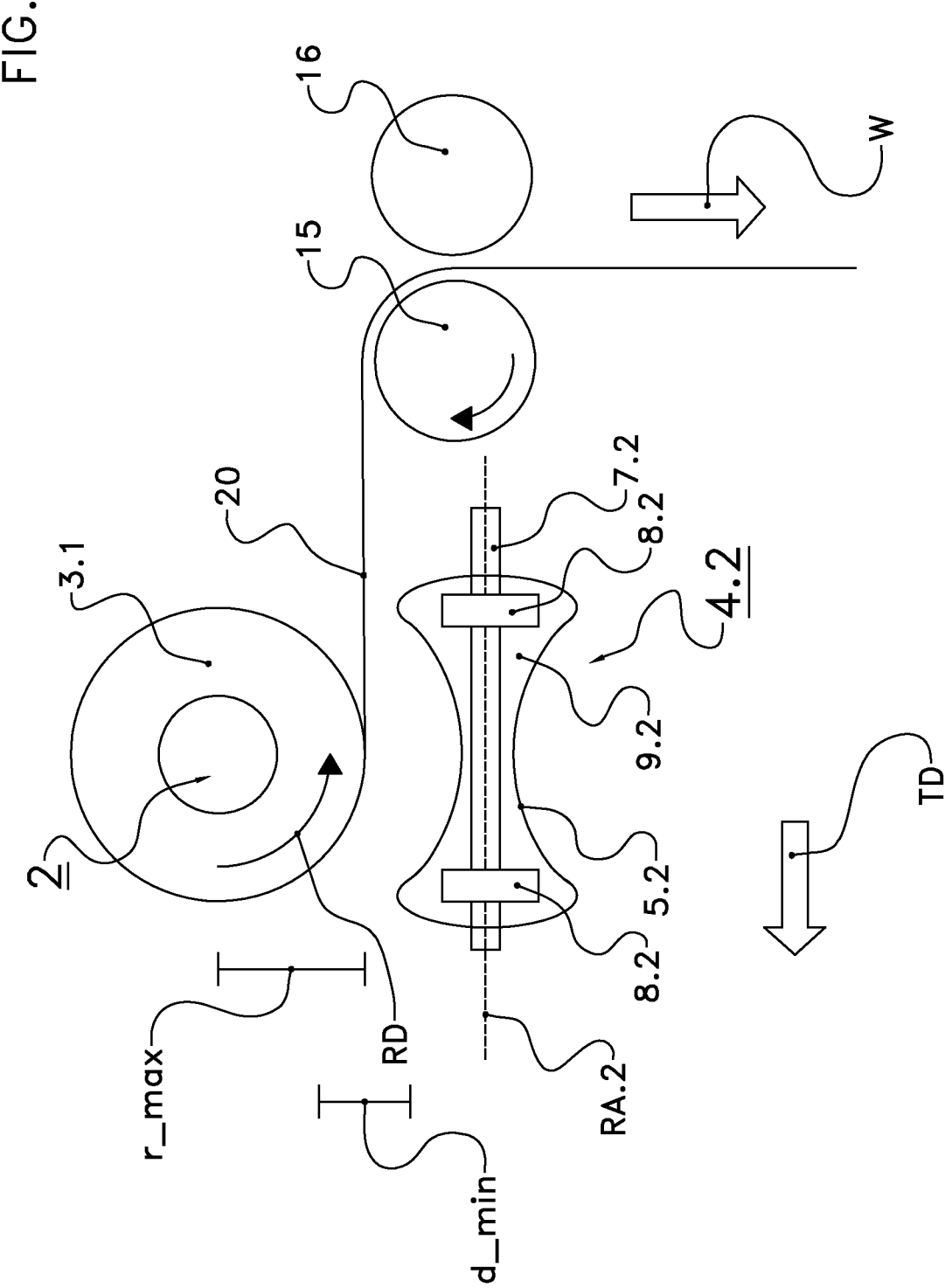
FIG. 2 shows in a horizontal viewing direction parallel to the shifting direction and perpendicular to the baler's travelling direction pointing to the right the wrapping device of FIG. 1 with the kept supply reel.

FIG. 1 and FIG. 2 show the wrapping device with an active supply reel 3.1 in an operating position, i.e. kept by the unrolling station being in a holding mode. Wrapping material can be pulled from the supply reel 3.1. FIG. 1 shows the wrapping device in a viewing direction antiparallel to the travelling direction TD. FIG. 2 shows the wrapping device of FIG. 1 in a viewing direction perpendicular to the travelling direction TD wherein the observer stands beside the left side of the baler. The terms "left" and "right" refer as usual to the travelling direction TD.

FIG. 1 shows
a receiving shaft stub 1 with a conical end piece 11,
a holding element 10.1 for the receiving shaft stub 1,
a moveable shaft stub 2 with a conical end piece 12,
a holding element 10.2 for the moveable shaft stub 2,
the supply reel 3.1 with wrapping material having the maximal radius r_max and held by the shaft stubs 1, 2,
the center axis CA of the round-cylindrical supply reel 3.1, and
two idler supporting rollers 4.1, 4.2 which are not used when the supply reel 3.1 is in the operating position.

The receiving shaft stub 1 belongs to the receiving unrolling station part and the movable shaft stub 2 to the further unrolling station part. The two shaft stubs 1, 2 and the holding elements 10.1, 10.2 belong to the unrolling station and the supporting rollers 4.1, 4.2 to the loading device of the embodiment. The holding elements 10.1, 10.2 are mounted at a front wall 18 of the baler, cf. FIG. 4.

As long as the supply reel 3.1 is not empty, the unrolling station 1, 2, 10.1, 10.2 is in a holding mode and the moveable shaft stub 2 is in a holding position. The two conical end pieces 11, 12 engage from two sides into the hollow kernel of the supply reel 3.1. The horizontal center axis CA of the supply reel 3.1 runs through the coaxial center axes of the lateral shaft stubs 1, 2. The moveable shaft stub 2 being in the holding position and the further shaft stub 1 keep the supply reel 3.1 from two sides. A minimal vertical distance d_min occurs between the circumferential surface of the supply reel 3.1 in the unrolling station 1, 2, 10.1, 10.2 and the circumferential surfaces of the supporting rollers 4.1, 4.2. Thanks to this vertical distance d_min the supply reel 3.1 can freely rotate around the reel center axis CA.

In one implementation at least one shaft stub 1, 2, preferably the receiving shaft stub 1, is decelerated by a brake (not shown) while a web 20 is pulled from the supply reel 3.1 and at least after the web 20 has been injected into the bale forming chamber. Thereby the supply reel 3.1 is also decelerated and the pulled web 20 is tensioned. It is also possible that a brake directly contacts and thereby decelerates the supply reel 3.1.

FIG. 2 shows the moveable shaft stub 2 and the supply reel 3.1 as well as the concave shape of the left idler supporting roller 4.2. In FIG. 2 the holding elements 10.1 and 10.2 are omitted. The receiving shaft stub 1 is behind the supply reel 3.1. The reel center axis CA is perpendicular to the drawing plane of FIG. 2. An idler pulling roller 16 is biased against a driven pulling roller 15. The two pulling rollers 15, 16 clamp the web 20 and pull the web 20 of wrapping material from the supply reel 3.1 until the web 20 is injected into the bale forming chamber. The web 20 is moved in the direction of the arrow W. Thereby the supply reel 3.1 is rotated in the rotating direction RD.

Neither the web 20 nor the circumferential surface of the rotating supply reel 3.1 touches the circumferential surfaces 5.1, 5.2 of the idler supporting rollers 4.1 or 4.2. Thereby no supporting roller 4.1, 4.2 impedes or even inhibits the rotation of the supply reel 3.1 while the supply reel 3.1 is in the operating position and is kept by the unrolling station 1, 2 being in the holding mode. The shaft stubs 1, 2 and the supporting rollers 4.1, 4.2 are positioned such that the following feature is fulfilled: The distance dist between the center axis CA of the active supply reel 3.1 and the circumferential surfaces 5.1, 5.2 of the supporting rollers 4.1, 4.2 is larger than the maximal radius r_max of the supply reel 3.1. Therefore at least the minimal vertical distance d_min between the circumferential surfaces of the supply reel 3.1 and of the supporting rollers 4.1, 4.2 occurs.

Remark: When a new supply reel 3.1 is places in the unrolling station 1, 2, 10.1, 10.2, it has the maximal radius r_max. The actual radius of the supply reel 3.1 decreases during operation as wrapping material is taken from the reel.

If the active supply reel 3.1 is empty or will not suffice for wrapping the bale currently being in the bale forming chamber, a human operator has to replace the empty supply reel 3.1 with a new supply reel 3.2. The empty supply reel 3.1 is to be removed out of the unrolling station 1, 2. The new supply reel 3.2 has to be transferred into a position between the two shaft stubs 1, 2 and has to be kept by them. For doing so the operator transfers the unrolling station 1, 2 into a releasing mode, replaces the empty supply reel 3.1 with the new supply reel 3.2, and transfers the unrolling station 1, 2 back into the holding mode such that the unrolling station 1, 2 holds the new supply reel 3.2. It is possible that a manipulator supports the operator and moves a supply reel 3.2 onto the supporting roller(s) 4.1, 4.2.

In order to make this replacement possible, the moveable shaft stub 2 can linearly be moved in an enlarging direction ED away from the receiving shaft stub 1 and in the opposite direction OD. By moving it in the enlarging direction ED, the moveable shaft stub 2 is moved out of holding position into a remote position and does no longer engage into the hollow kernel of the supply reel 3.1. The distance between the shaft stubs 1 and 2 increases. After this movement in the enlarging direction ED the empty supply reel 3.1 can be taken out of the operating position and a new supply reel 3.2 can be inserted in a place between the two shaft stubs 1, 2. After the shaft stub 2 is moved in the opposite direction OD towards the receiving shaft stub 1 and the shaft stubs 1 and 2 engage through its hollow kernel, the new supply reel 3.2 is kept by the unrolling station 1, 2.

Figure 3:
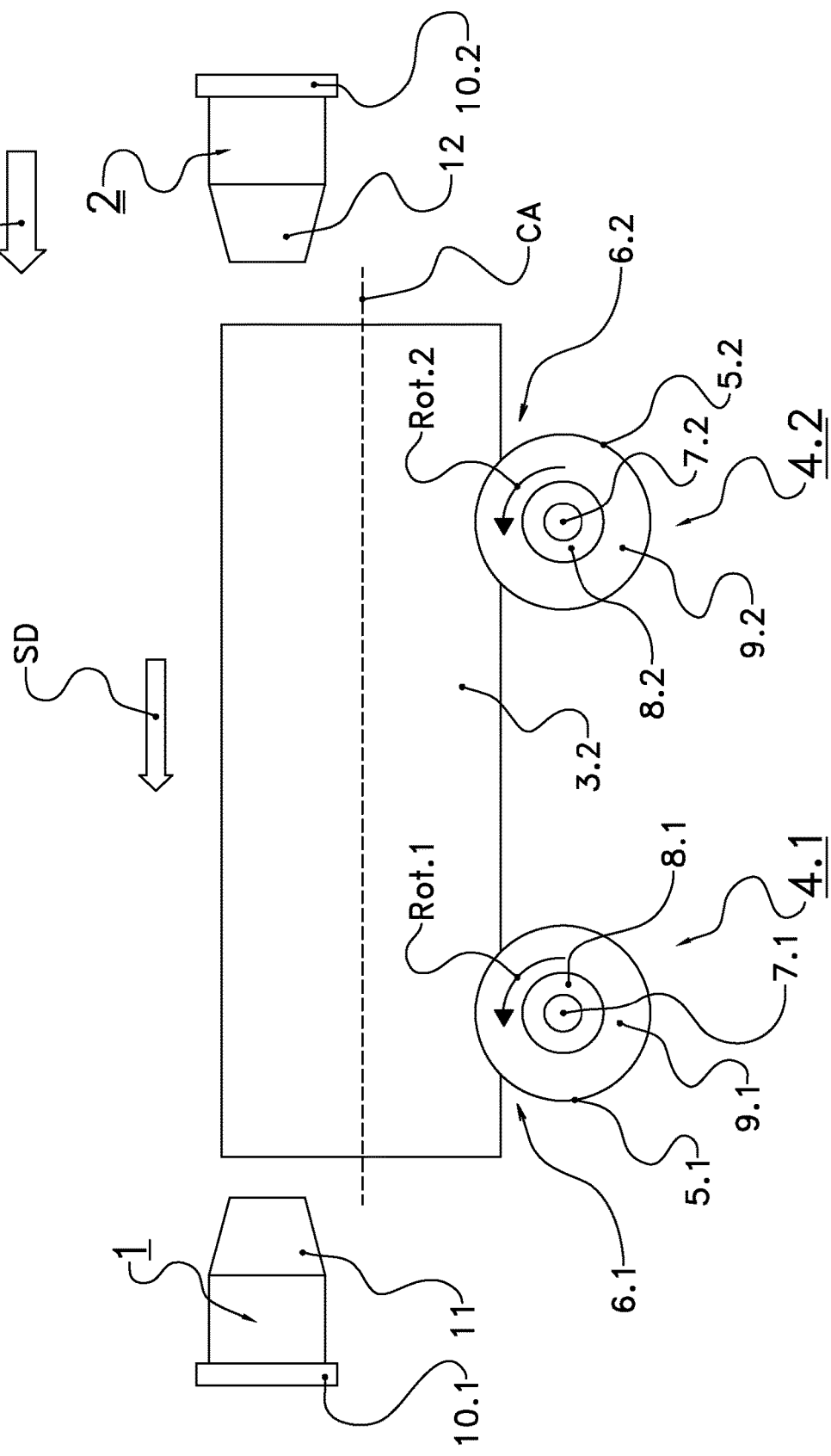
FIG. 3 shows the wrapping device of FIG. 1 and FIG. 2 in the viewing direction of FIG. 1 with the moveable holding member being in the remote position and a new supply reel which rests on the supporting rollers and is to be inserted into the unrolling station.
Figure 4:
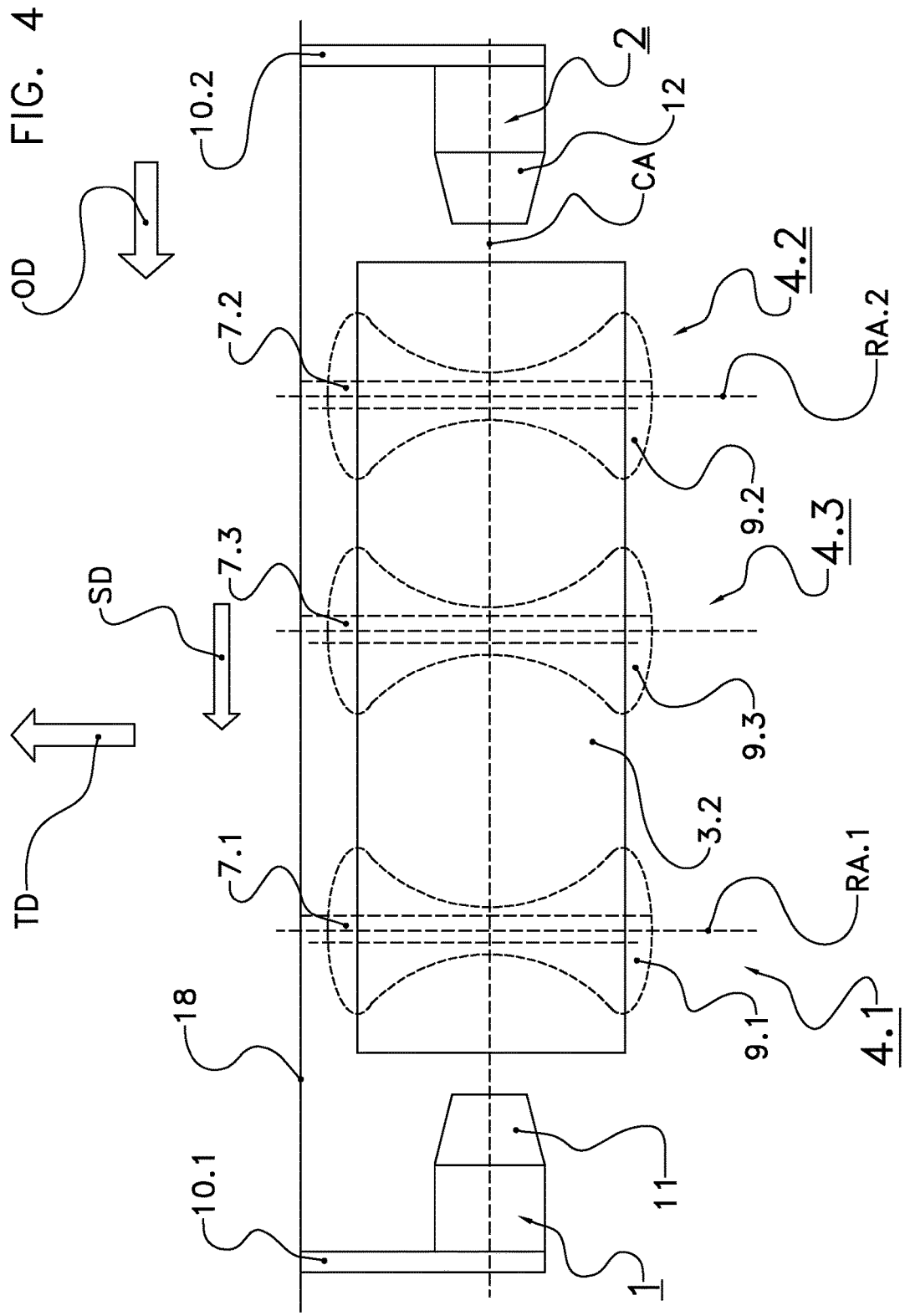
FIG. 4 shows in a top view a loading device with three supporting rollers holding the new supply reel.
Figure 5:
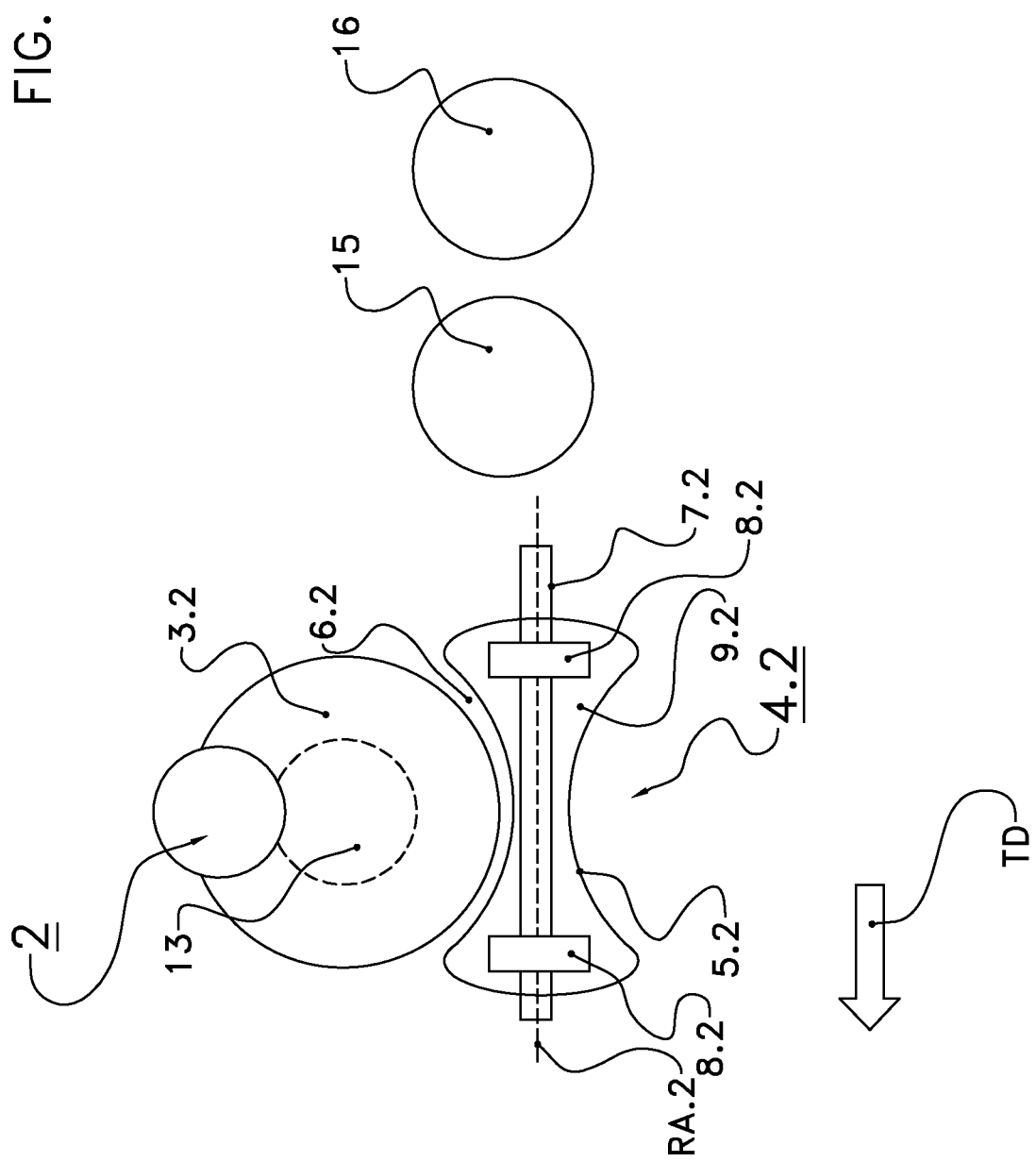
FIG. 5 shows in the viewing direction of FIG. 2 the wrapping device of FIG. 1 to FIG. 3 with the new supply reel resting on both supporting rollers.

FIG. 1 to FIG. 5 show a first embodiment of the wrapping device according to the invention. FIG. 3 to FIG. 5 illustrate the insertion of a new reel 3.2 into the place between the two shaft stubs 1, 2. FIG. 3 shows the first embodiment in the horizontal viewing direction of FIG. 1, FIG. 4 in a top view, and FIG. 5 in the horizontal viewing direction of FIG. 2. The following parts are shown:
the unrolling station with the shaft stubs 1, 2 being in the releasing mode,
the holding elements 10.1, 10.2 mounted at a front wall 18 (cf. FIG. 4),
the roller bodies 9.1, 9.2 of the supporting rollers 4.1, 4.2,
the stationary roller axles 7.1, 7.2 which are in the first embodiment rigidly connected with the front wall 18 and on which the roller bodies 9.1, 9.2 are rotatably mounted,
the stationary roller rotating axes RA.1, RA.2 which are rigidly mounted at the front wall 18 and around which the rollers 4.1, 4.2 can rotate, and
two free-wheel clutches 8.1, 8.2 (to be explained below).

In one implementation the roller axles 7.1, 7.2 are guided through the tubular roller bodies 9.1, 9.2. It is possible that a ball bearing is arranged between the roller body 9.1, 9.2 and the roller axle 7.1, 7.2. This implementation achieves a high stability. In a further arrangement the roller axle 7.1, 7.2 only engage through a part of the roller body 9.1, 9.2. It is further possible that the roller body 9.1, 9.2 is rotatably mounted at a roller support, e.g. a disk, at the front wall 18. FIG. 4 shows a third supporting roller 4.3 being in a centered position between the other supporting rollers 4.1, 4.2 and between the two shaft stubs 1, 2. In one implementation the loading device comprises a sequence with three supporting rollers 4.1, 4.2, 4.3 as shown in FIG. 4. In a further implementation (not shown) the loading device only comprises the centered supporting roller 4.3 or only the supporting roller adjacent to the receiving shaft stub 1 and no further supporting rollers.

As can be seen in FIG. 3 to FIG. 5, a first gap occurs between the receiving shaft stub 1 and the supporting roller 4.1. A second gap occurs between the further shaft stub 2 and the supporting roller 4.2. An intermediate gap occurs between the supporting rollers 4.1 and 4.2. Thanks to the gaps it is possible to carry from below and to move the supply reel 3.2 when grasping it through at least one gap.

In the first embodiment the supporting rollers 4.1, 4.2 take only one operating position with respect to the unrolling station 1, 2. A human operator moves the moveable shaft stub 2 away from the receiving shaft stub 1 into the remote position and removes the hollow reel kernel of the empty supply reel 3.1. The operator or a manipulator places the new supply reel 3.2 onto the two idler supporting rollers 4.1, 4.2. Thanks to the invention the new supply reel 3.2 can selectively be moved from a position in front or besides the loading device and can be lifted and/or shifted onto the supporting rollers 4.1 and 4.2. In the first embodiment the rotating axles 7.1, 7.2 and the rotating axes RA.1, RA.2 of these idler supporting rollers 4.1, 4.2 are horizontal and parallel to the travelling direction TD of the baler, i.e. perpendicular to the drawing plan of FIG. 3 and FIG. 5 and in the drawing plane of FIG. 4. In FIG. 5 the distance between the left supporting roller 4.2 and the supply reel 3.2 is shown exaggerated. FIG. 5 also shows the hollow kernel 13 of the supply reel 3.2. When placing the new supply reel 3.2 on the loading device and later into the unrolling station, the pulling rollers 15, 16 do not rotate. The new supply reel 3.2 rests on two contact areas 6.1, 6.2 belonging to the two circumferential surfaces 5.1, 5.2 of the supporting rollers 4.1, 4.2. The two contact areas 6.1, 6.2 define a curved surface on which the supply reel 3.2 rests.

Preferably the circumferential surface 5.1, 5.2 of such a supporting roller 4.1, 4.2 and therefore the contact area 6.1, 6.2 is concave and is adapted to the radius r_max and therefore to the circumferential surface of the full supply reel 3.2 which can best be seen in FIG. 5. The radius of the concave roller part is equal to or at most 20% larger than the radius r_max of the new supply reel 3.2. This feature reduces the risk that the new supply reel 3.2 rolls in a direction away from the bale forming chamber and in the travelling direction TD and drops from the supporting rollers 4.1, 4.2.

As can best be seen in FIG. 2 and FIG. 5, a cross section through the concave circumferential surface 5.1, 5.2 comprises two curved segments, namely an upper curved segment and a lower curved segment. Every curved segment may comprise a circular or elliptic segment. The minimal radius of such a curved segment is larger than the radius r_max of the supply reel 3.2 but preferably not more than 20% larger, preferably about 10% larger. A numeral example: The radius of the new supply reel 3.2 is r_max=110 mm and the minimal radius of the curved segment is 120 mm.

Preferably the circumferential surface 5.1, 5.2 of the supporting roller 4.1, 4.2 is made of an elastic material, e.g. of rubber or plastic. This embodiment reduces the wear which the supply reel 3.2 undergoes. If rubber is used, a high friction and a low slippage between the circumferential roller surface 5.1, 5.2 and the circumferential surface of the supply reel 3.2 occur.

After the human operator or the manipulator has placed the new supply reel 3.2 onto the two supporting rollers 4.1 and 4.2, the supply reel 3.2 rests on two contact areas 6.1, 6.2. The operator shifts the new supply reel 3.2 in the shifting direction SD (in the drawing planes of FIG. 3 and FIG. 4 horizontally from right to left) towards the receiving shaft stub 1. By shifting the supply reel 3.2 the idler supporting rollers 4.1, 4.2 are set into rotation. FIG. 3 shows the effected rotating directions Rot.1, Rot. 2. After shifting the supply reel 3.2, the operator slightly lifts the new supply reel 3.2 from the supporting roller 4.1 and shifts the supply reel 3.2 over the conical end piece 11 of the receiving shaft stub 1. Afterwards the operator moves the moveable shaft stub 2 in the direction OD towards the receiving shaft stub 1. Now both shaft stubs 1 and 2 engage into the hollow kernel of the supply reel 3.2 and the new supply reel 3.2 is rotatably held by the two shaft stubs 1, 2 as can be seen in FIG. 1. Web 20 can now be pulled from the new supply reel 3.2.

In the situation shown in FIG. 3 to FIG. 5 the shifting direction SD is substantially horizontal. It is possible that the operator shifts the new supply reel 3.2 in an ascending shifting direction SD towards the receiving shaft stub 1. It is further possible that the baler is operated in a hilly environment. The baler can be tilted around an axis parallel or angular to the travelling direction TD. Therefore it may happen that the force of gravity tends to move the supply reel 3.2 away from the receiving shaft stub 1, i.e. opposite to the shifting direction SD, while the supply reel 3.2 rests on the or one supporting roller 4.1, 4.2. When inserting the supply reel 3.2 according to the first embodiment, the supply reel 3.2 is shortly kept by the conical end piece 11 and supporting by the other supporting roller 4.2. Therefore the supply reel 3.2 may be moved away from the receiving shaft stub 1 due to the force of gravity.

To avoid this undesired event, the roller bodies 9.1, 9.2 of the supporting rollers 4.1, 4.2 are in one implementation mounted on the two stationary roller axles 7.1, 7.2 by means of two free-wheel clutches 8.1, 8.2, e. g. free-wheel clutches similar to a clutch known from a bicycle. Thanks to these free-wheel clutches 8.1, 8.2 the supporting rollers 4.1, 4.2 can freely rotate in one direction Rot.1, Rot.2 (in FIG. 3 and FIG. 9 anti-clockwise). Thereby the supporting rollers 4.1, 4.2 enable a shift of the supply reel 3.2 in the shifting direction SD. The free-wheel clutches 8.1, 8.2, however, inhibit an undesired rotation in the opposite direction (in FIG. 3 and FIG. 5 and FIG. 10 clockwise). Thanks to the free-wheel clutches 8.1, 8.2 the new supply reel 3.2 resting on the supporting rollers 4.1, 4.2 cannot move away from the receiving shaft stub 1. It is also possible that only the supporting roller 4.2 adjacent to the moveable shaft stub 2 or only the supporting roller 4.1 adjacent to the receiving shaft stub 1 comprises a free-wheel clutch 8.2.

In the first embodiment shown in FIG. 1 to FIG. 5 the distances between the roller bodies 9.1, 9.2 and the front wall 18 cannot be amended. The roller bodies 9.1, 9.2 can rotate around the roller axles 7.1, 7.2 but cannot be moved otherwise. The roller axles 7.1, 7.2 are rigidly connected with the front wall 18.

Figure 6:
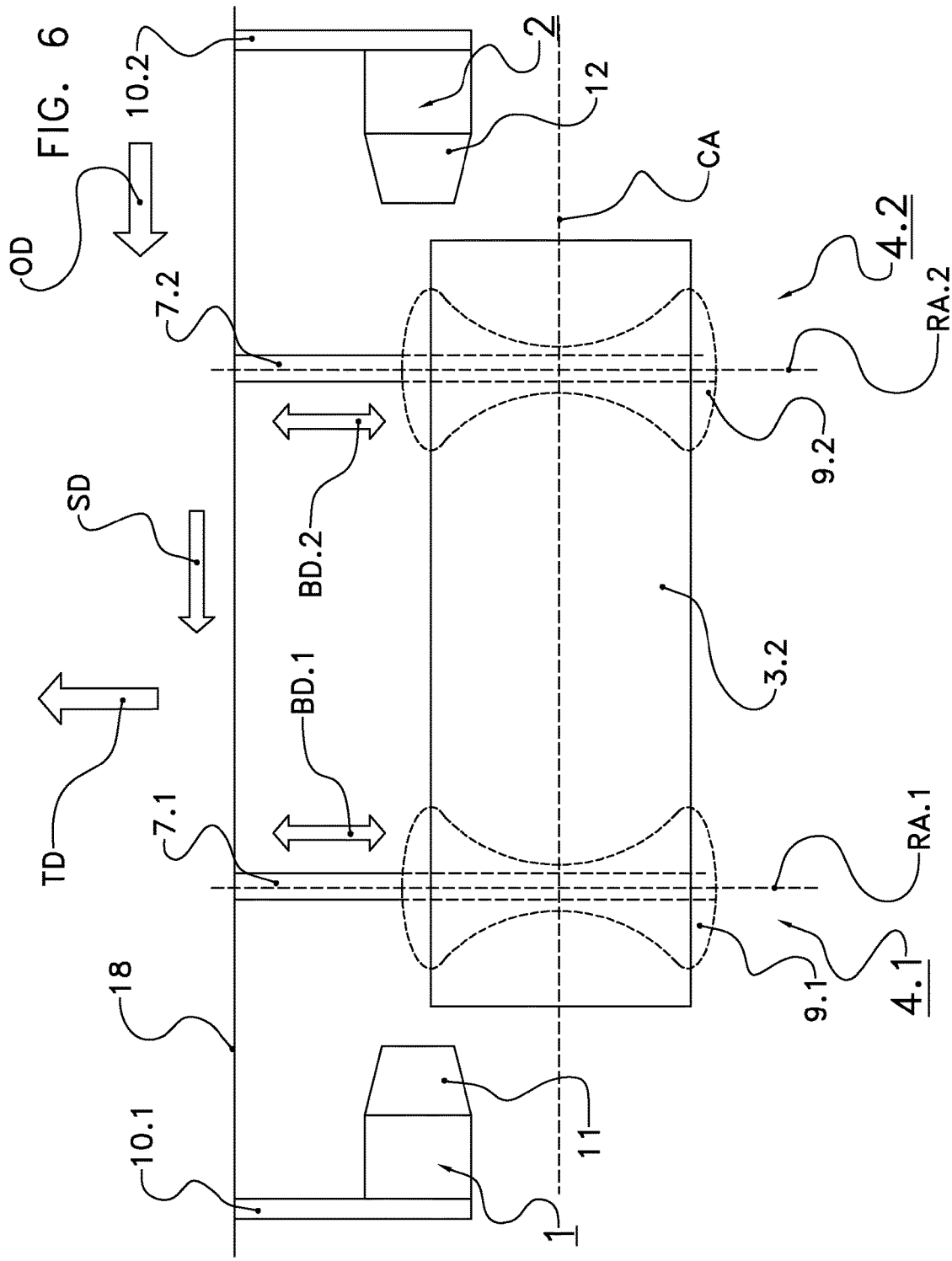
FIG. 6 shows in the top view of FIG. 4 a second embodiment with two supporting rollers comprising roller bodies which can be shifted along the roller axles.

FIG. 6 shows in a top view a second embodiment. The roller body 9.1 can be shifted with respect to the roller axle 7.1 and thereby with respect to the front wall 18 in two opposing direction parallel to the rotating axis RA.1 (double arrow BD.1). The roller body 9.2 can be shifted with respect to the roller axle 7.2 in two opposing directions parallel to the rotating axis RA.2 (double arrow BD.2). For inserting the new supply reel 3.2, the operator shifts the roller bodies 9.1, 9.2 away from the front wall 18 into the remote positions shown in FIG. 6. In the remote position the roller bodies 9.1, 9.2 have a larger distance to the front wall 18. The operator places the new supply reel 3.2 on the roller bodies 9.1, 9.2 being in the remote positions. The operator shifts the roller bodies 9.1, 9.2 carrying the supply reel 3.2 back towards the front wall 18. Now the operator shifts the supply reel 3.2 in the shifting direction SD.

Figure 7:
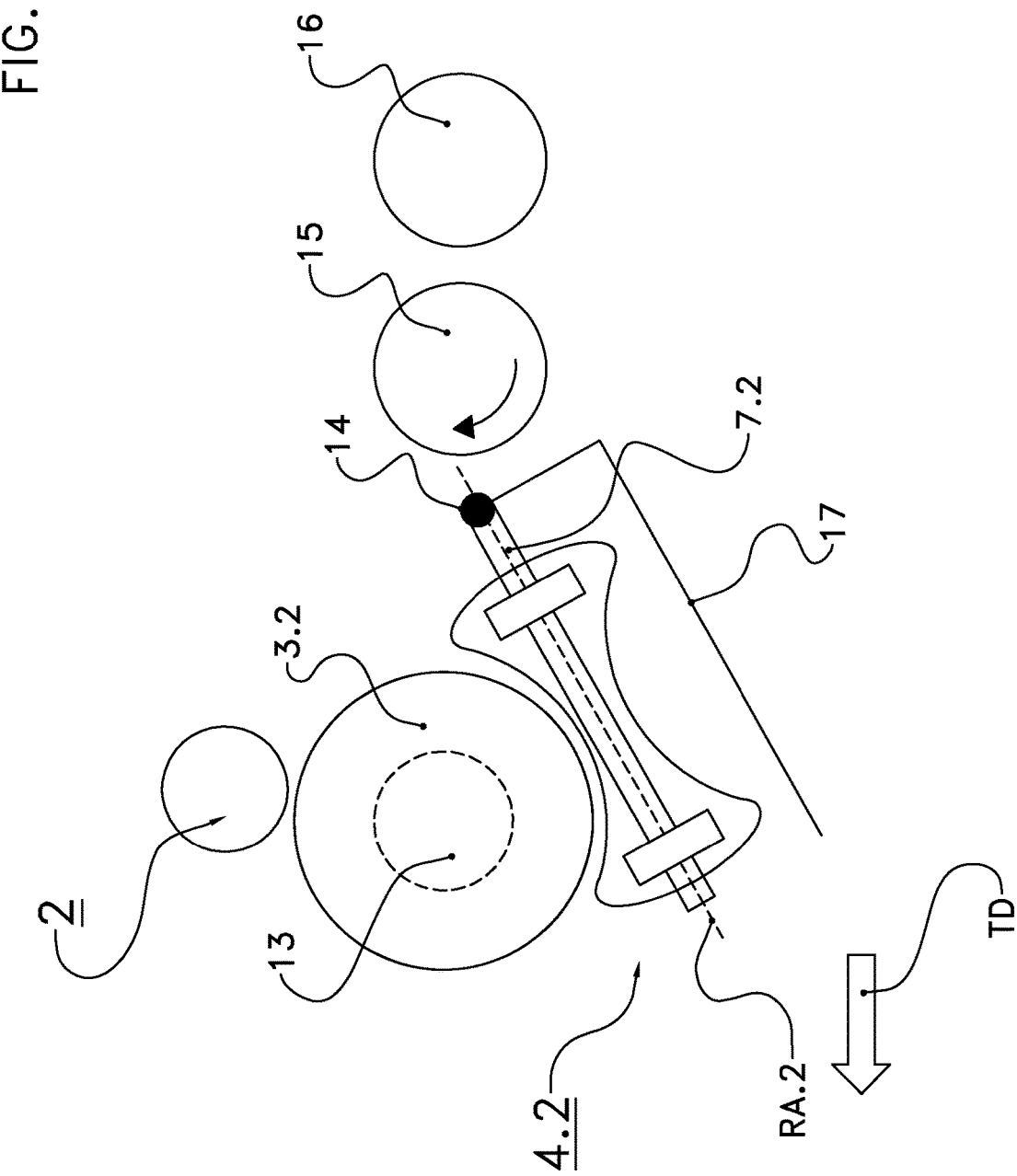
FIG. 7 shows in the viewing direction of FIG. 2 and FIG. 5 a third embodiment of the loading device with roller axles being pivotal around a horizontal axis.
Figure 8:
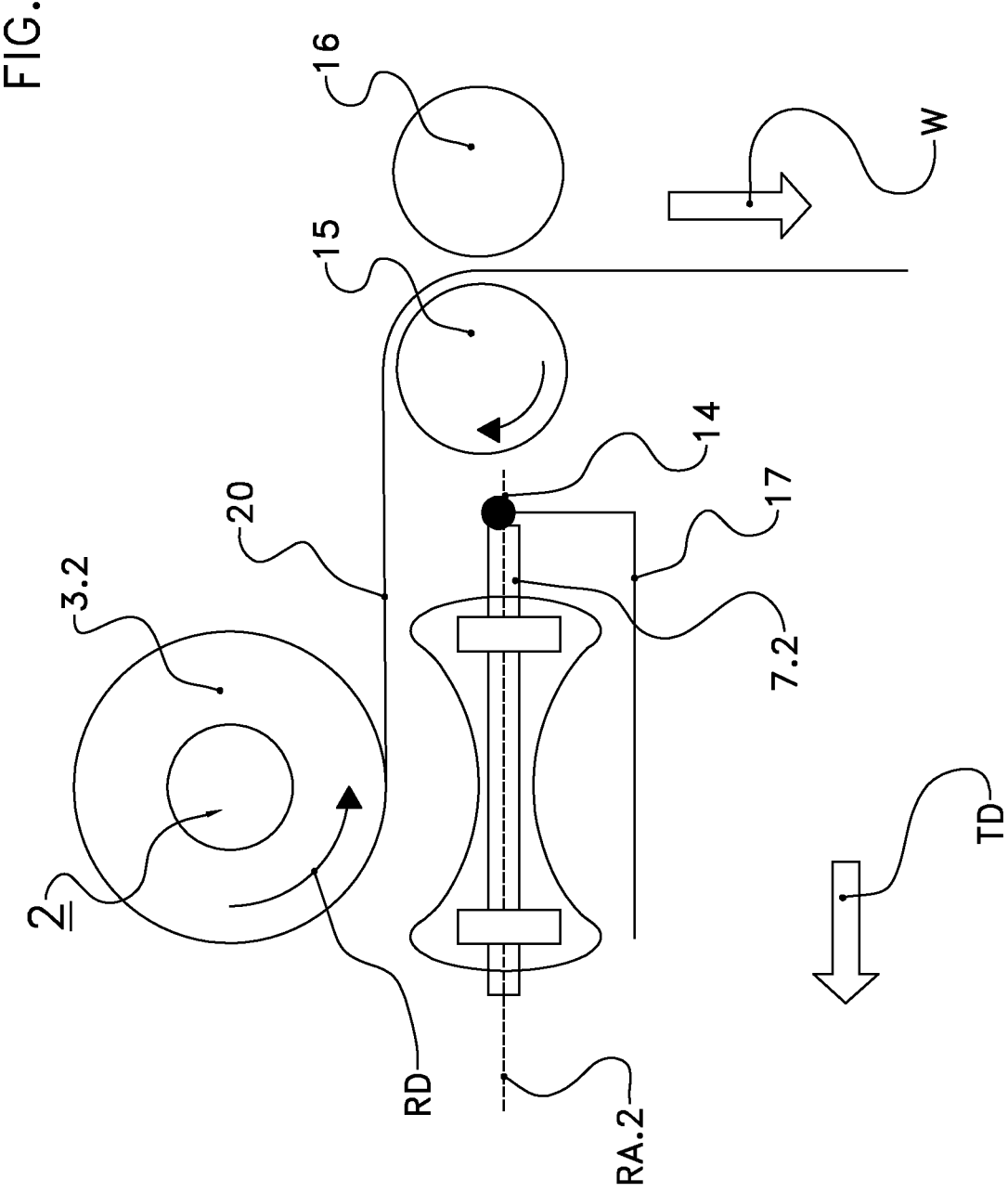
FIG. 8 shows the second embodiment of FIG. 6 with the supply reel kept by the unrolling station.

FIG. 7 and FIG. 8 show in a side view a third embodiment of the invention. In contrast to the embodiments shown in FIG. 1 to FIG. 6 the two roller axles 7.1, 7.2 for the rollers 4.1, 4.2 are pivotal with respect to the front wall 18. Both roller axles 7.1, 7.2 can be pivoted around a horizontal pivoting axle 14 which is perpendicular to the travelling direction TD and also perpendicular to the drawing planes of FIG. 7 and FIG. 8. The axle 14 is positioned between the supporting rollers 4.1, 4.2 and the front wall 18 and is preferably mounted at the front wall 18.

FIG. 7 shows the two supporting rollers 4A, 4.2 in a receiving position, FIG. 8 in an inserting position. Seen in the travelling direction TD (in FIG. 7 and FIG. 8 from right to left) the roller axles 7.1, 7.2 descend with a sloping angle, preferably between 20 and 40 degrees when the supporting rollers 4.1, 4.2 are in the receiving position. The operator or a manipulator places the new supply reel 3.2 onto the supporting rollers 4.1, 4.2 being in the receiving position. The concave shape of the supporting rollers 4.1 and 4.2 reduces the risk that the supply reel 3.2 drops in the travelling direction TD from the loading device. The operator—or a drive—pivots the supporting rollers 4.1, 4.2 carrying the supply reel 3.2 around the axis 14 from the receiving position shown in FIG. 7 into the inserting position shown in FIG. 8. The roller axles 7.1, 7.2 are now horizontal. Preferably the roller axles 7.1, 7.2 are locked in the receiving position of FIG. 7 and/or in the inserting position of FIG. 8. The operator shifts the new supply reel 3.2 in the shifting direction SD (perpendicular to the drawing planes of FIG. 7 and FIG. 8) and inserts the supply reel 3.2 to the unrolling station 1, 2. Preferably the roller axles 7.1, 7.2 remain locked while the supply reel 3.2 is kept by the unrolling station 1, 2 and is used for wrapping bales.

In one implementation the axles 7.1, 7.2 of the supporting rollers 4.1, 4.2 are mounted on a carrying axle 14. Either the carrying axle 14 can pivot with respect to the front wall 18. Or the roller axes 7.1, 7.2 can pivot with respect to the carrying axle 14. In a further implementation a supporting roller frame 17 carries the supporting rollers 4.1, 4.2. The roller axles 7.2, 7.2 are rigidly connected with this frame 17, cf. FIG. 7 and FIG. 8. The roller bodies 9.1, 9.2 can rotate around the roller axles 7.1, 7.2. The entire frame 17 together with the rollers 4.1, 4.2 can be pivoted around the axle 14.

Figure 9:
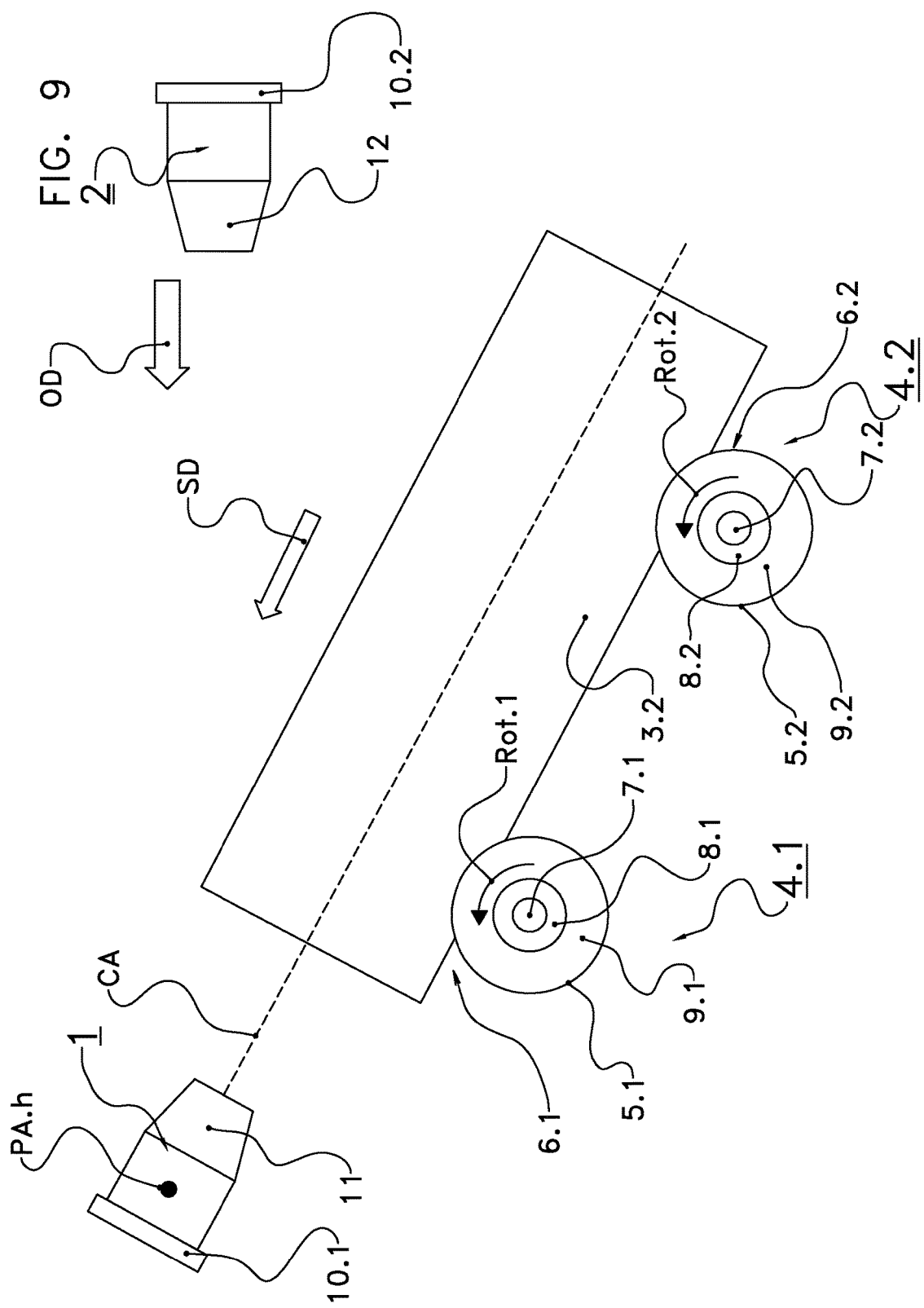
FIG. 9 shows in the viewing direction of FIG. 1 and FIG. 3 a fourth embodiment of the loading device with the new supply reel resting on both supporting rollers wherein the rollers provide an ascending plane.
Figure 10:
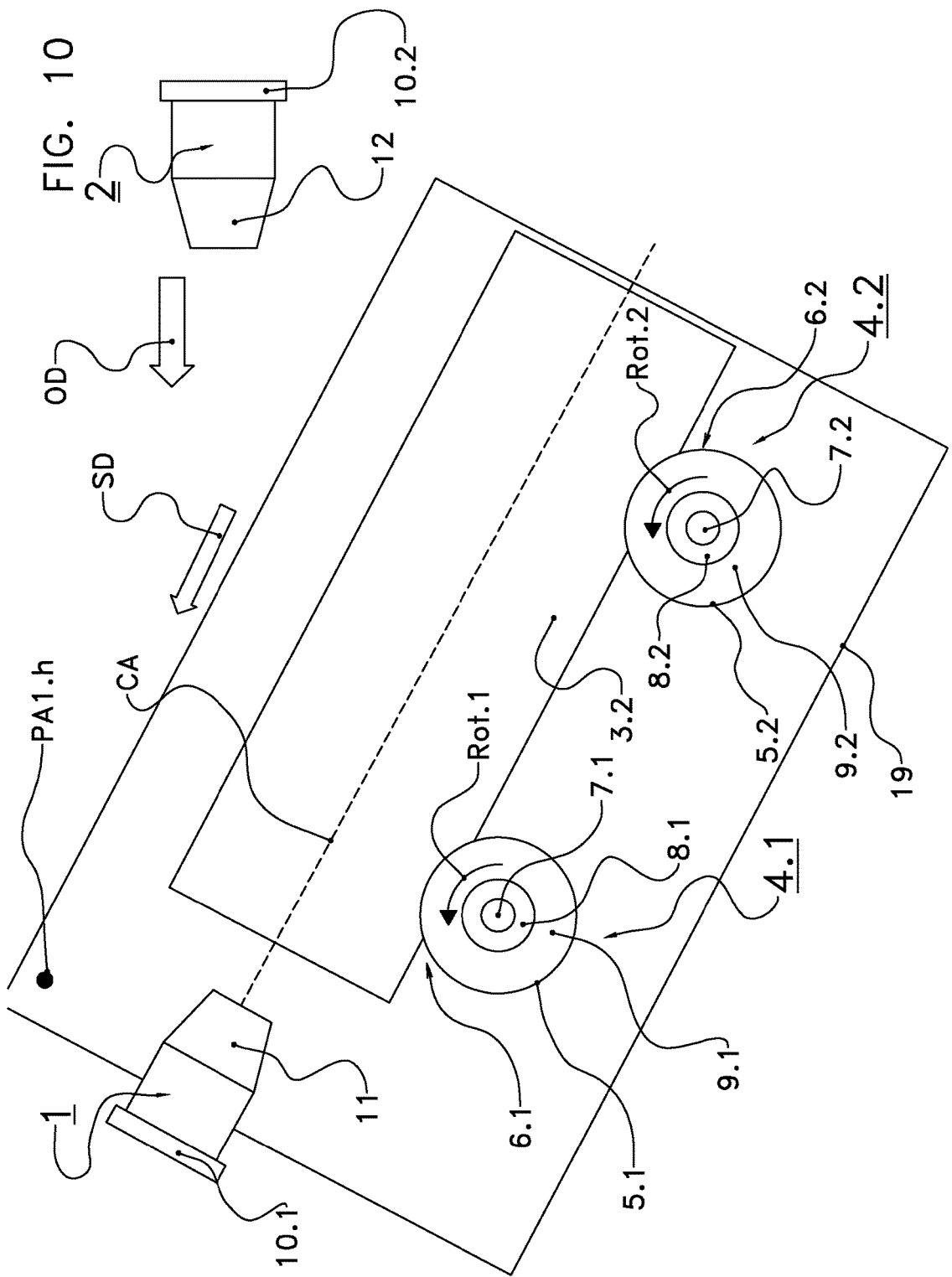
FIG. 10 shows a variant of the fourth embodiment with a supporting roller frame being pivotal around a horizontal pivoting axis parallel to the travelling direction.

FIG. 9 and FIG. 10 show in the common viewing direction of FIG. 1 and FIG. 3 two variants of a fourth embodiment of the invention. In this fourth embodiment the receiving shaft stub 1 can be rotated or otherwise pivoted around a pivoting axis PA.h or PA1.h which is horizontal and parallel to the travelling direction TD and thereby perpendicular to the shifting direction SD and to the drawing plane of FIG. 9 and FIG. 10. The receiving shaft stub 1 can be pivoted around the horizontal pivoting axis PA.h, PA1.h between a holding position, cf. FIG. 1, and a receiving position, cf. FIG. 9 and FIG. 10.

The supporting roller 4.1 adjacent to the receiving shaft stub 1 (in FIG. 9 and FIG. 10 the left roller) has a higher vertical distance to the ground than the supporting roller 4.2 adjacent to the movable shaft stub 2. Therefore the two stationary rotating axes RA.1, RA.2 of the supporting idler rollers 4.1, 4.2 form a plane ascending to the receiving shaft stub 1 and parallel to the reel center axis CA. The supply reel 3.2 resting on the supporting rollers 4.1, 4.2 can be shifted in an ascending shifting direction SD towards the receiving shafts stub 1. Preferably the free-wheel clutches 8.1. 8.2 inhibit that the force of gravity moves the supply reel 3.2 away from the receiving shaft stub 1.

In the variant of FIG. 9 only the receiving shaft stub 1 can be pivoted with respect to the front wall 18 and therefore with respect to the moveable shaft sub 2 around the horizontal pivoting axis. FIG. 9 shows this horizontal pivoting axis PA.h of the receiving shaft stub 1. The rotating axes RA.1, RA.2 of the supporting rollers 4.1, 4.2 are stationary. Therefore the supporting rollers 4.1, 4.2 are stationary and are always in the position with the ascending plane of FIG. 9.

In the variant of FIG. 10 a loading device frame 19 carries both supporting rollers 4.1 and 4.2 and the receiving shaft stub 1. The loading device frame 19 can be pivoted with respect to the front wall 18 and therefore with respect to the moveable shaft sub 2 around a horizontal pivoting axis PA1.h which is preferably spaced apart from the receiving shaft stub 1. Therefore both supporting roller 4.1, 4.2 and the receiving shaft stub 1 can be pivoted around the horizontal axis PA1.h. The loading device frame 19 can be pivoted into a position behind the shaft stubs 1, 2.

In yet a further variant (not shown) of the fourth embodiment the receiving shaft stub 1 is not pivotal. Only the supporting rollers 4.1, 4.2 can be pivoted around a horizontal pivoting axis, e.g. by means of the loading device frame 19 of FIG. 10. After the supply reel 3.2 has been shifted in the ascending shifting direction SD towards to the receiving shaft stub 1, the receiving shaft stub 1 engages angularly into the hollow kernel of the supply reel 3.2. Thanks to the conical end piece the receiving shaft stub 1 nevertheless carry the supply reel 3.2. Later the operator lifts the supply reel 3.2 into a horizontal position.

According to every variant of the fourth embodiment the operator or the manipulator places the new supply reel 3.2 onto the supporting idler rollers 4.1, 4.2. The operator shifts the supply reel 3.2 in the ascending shifting direction SD towards the receiving shaft stub 1. There is no need to lift the supply reel 3.2 upwards and away from a supporting idler roller 4.1, 4.2 while the supply reel 3.2 is shifted upwards. The human operator shifts the supply reel 3.2 over the conical end piece 11 being in the receiving position and now rotates the supply reel 3.2 together with the receiving shaft stub 1 around the horizontal pivoting axis such that the reel center axis CA becomes horizontal. Now the operator holds the supply reel 3.2 and moves the moveable shaft stub 2 towards the receiving shaft stub 1 such that the conical end piece 12 enters into the kernel of the new supply reel 3.2. Optionally the operator locks the receiving shafts stub 1 in the holding position. The new supply reel 3.2 is now in the operating position. The operator inserts the web 20 into the gap between the two rollers 15, 16.

Figure 11:
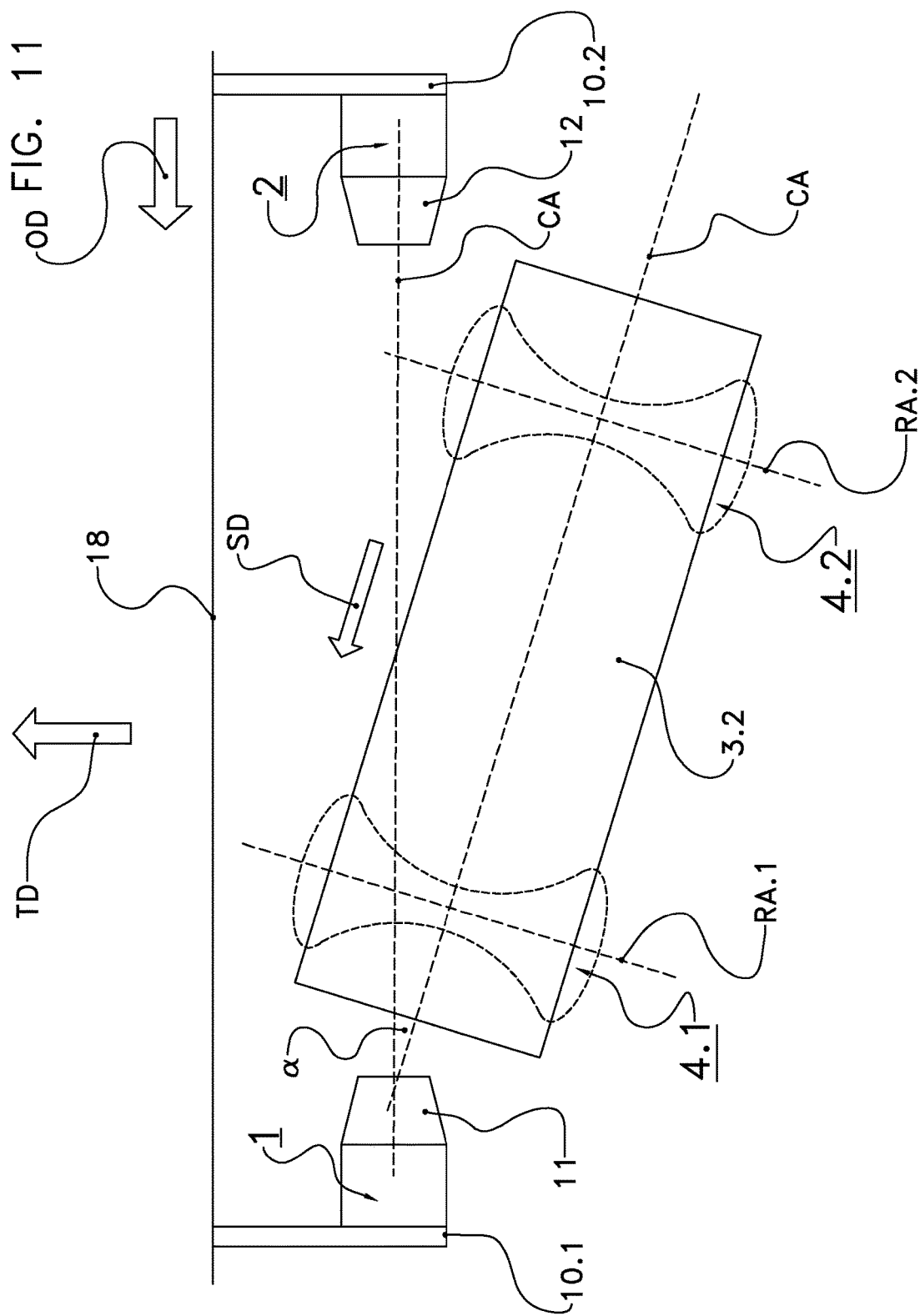
FIG. 11 shows in a top view a fifth embodiment of the loading device with two supporting rollers providing an angular horizontal plane with the new supply reel resting on both supporting rollers.
Figure 12:
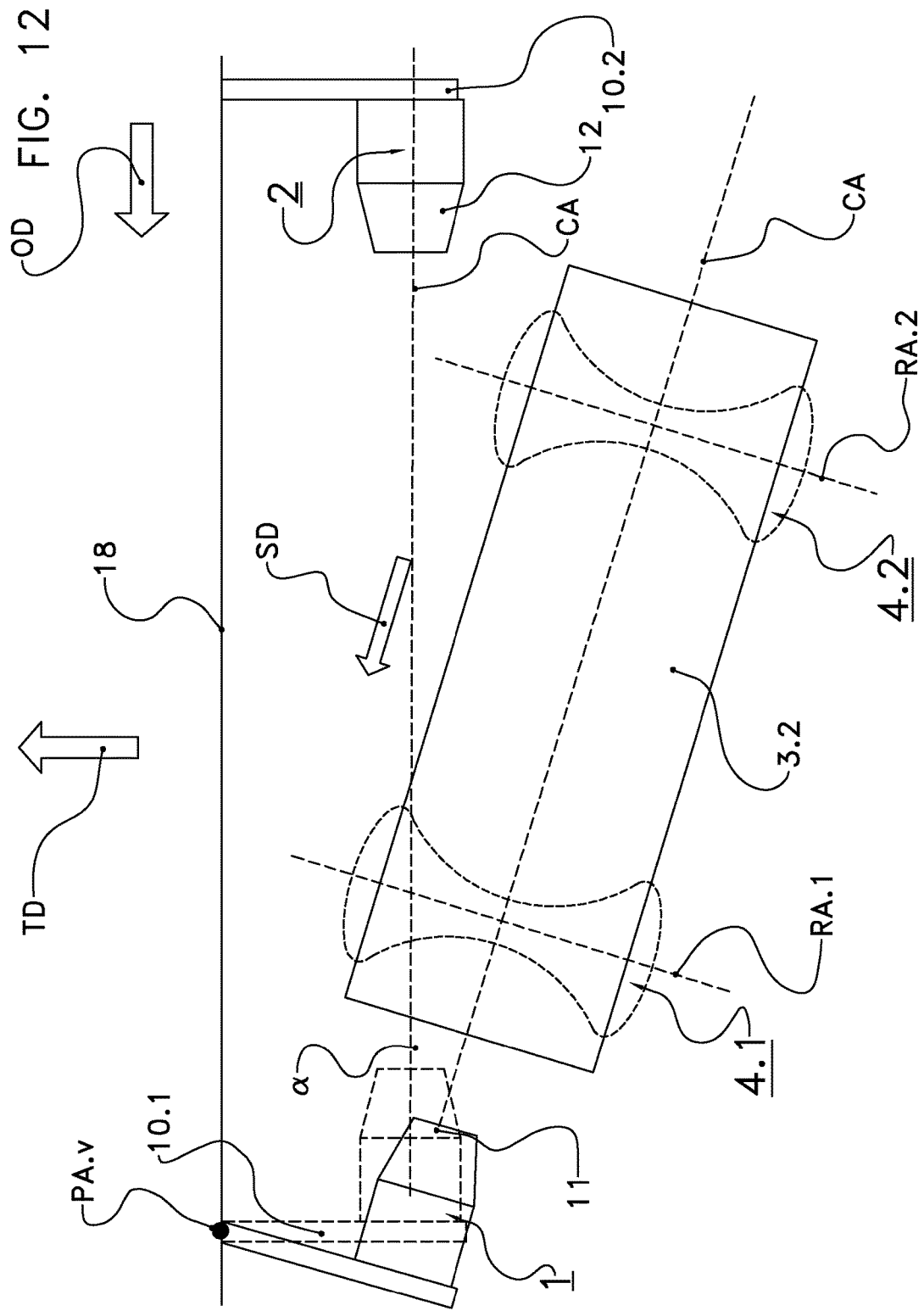
FIG. 12 shows in a top view a variation of the fifth embodiment of FIG. 11 with a pivotal receiving shaft stub.

FIG. 11 and FIG. 12 show two different implementations of a fifth embodiment in a top view, i.e. in the viewing direction of FIG. 4. In this fifth embodiment the stationary roller axles 7.1, 7.2 and therefore the pivoting axes RA.1, RA.2 are not perpendicular to the travelling direction TD— not perpendicular permanently or at least when the supply reel 3.2 is placed on the supporting rollers 4.1, 4.2. In contrast an angle α of preferably not more than 20 degrees between the shifting direction SD for the new supply reel 3.2 and the center axis CA of an inserted supply reel 3.1 held by the two shaft stubs 1, 2 occurs. An angle of 90 degrees minus α occurs between the front wall 18 and the roller rotating axles RA.1, RA.2: Therefore the distance between the supporting roller 4.1 and the receiving shaft stub 1 being in the receiving position is smaller than the distance between the supporting roller 4.2 and the moveable shaft stub 2. The distance between the roller 4.1 adjacent to the receiving shaft stub 1 and the front wall 18 is smaller than the distance between the roller 4.2 adjacent to the movable shaft stub 2 and the front wall 18. This arrangement makes it often easier and thereby more ergonomic for the human operator or less error-prone for a manipulator to place the supply reel 3.2 on the supporting rollers 4.1, 4.2 and to shift it in the shifting direction SD.

In the fifth embodiment as shown in FIG. 11 the receiving shaft stub 1 cannot be pivoted. When placing the supply reel 3.2 on the receiving shaft stub 1, an angle α between the center axis CA of the supply reel 3.2 and the center axis of the receiving shaft stub 1 occurs. This angle α also occurs between the shifting direction SD and the stub center axis. Thanks to the conical end piece 11 of the receiving shaft stub 1 the supply reel 3.2 is nevertheless also kept when the shaft stub 2 is in the remote position.

In the variation of the fifth embodiment as shown in FIG. 12, however, the receiving shaft stub 1 can be moved (rotated) around a lateral vertical pivoting axis PA.v between two positions. FIG. 12 shows the receiving shaft stub 1 in the angular receiving position (continuous line) and in the holding position (dotted line). Preferably the receiving shaft stub 1 can be locked in the receiving position and/or in the holding position. The operator releases the receiving shaft stub 1, pivots it into the angular receiving position, shifts the new supply reel 3.2 over the receiving shaft stub 1, pivots the new supply reel 3.2 and thereby the receiving shaft stub 1 around the vertical axis PA.v into the holding (operating) position, and moves the moveable shaft stub 2 in the opposite direction OD. The receiving shaft stub 1 is preferably locked again.

The fourth embodiment (FIG. 9, FIG. 10) can be combined with the fifth embodiment (FIG. 11, FIG. 12). Thanks to this combination the new supply reel 3.2 is shifted in the shifting direction SD towards the receiving shaft stub 1 wherein the shifting direction SD is ascending (fourth embodiment) and is angular to the center axis CA of the supply reel 3.1 being in the unrolling station 1, 2 (fifth embodiment).

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

| | LIST OF REFERENCE SIGNS |
|---|---|
| 1 | receiving shaft stub, belongs to the receiving unrolling station part, has a conical end piece 11 |
| 2 | moveable shaft stub, belongs to the further unrolling station part, has a conical end piece 12 |
| 3.1 | active supply reel with wrapping material, held by the unrolling station 1, 2, 10.1, 10.2 such that its center axis CA is horizontal |
| 3.2 | new supply reel, to be inserted into the unrolling station 1, 2, 10.1, 10.2 |
| 4.1, 4.2 | idler supporting rollers, belong to the loading device, comprise the roller bodies 9.1, 9.2 and the roller axles 7.1, 7.2 |
| 4.3 | central supporting roller, belongs to the loading device, comprise the roller body 9.3 and the roller axle 7.3 |
| 5.1, 5.2 | concave circumferential surfaces of the supporting rollers 4.1, 4.2 |
| 6.1, 6.2 | contact areas of the circumferential surfaces 5.1, 5.2, contact from below the circumferential surface of the supply reel 3.2 |
| 7.1, 7.2 | stationary or pivotal roller axles on which the roller bodies 9.1, 9.2 are mounted, are mounted at the front wall 18 or at the frame 17 or at the frame 19 |
| 8.1, 8.2 | free-wheel clutches of the rollers 4.1, 4.2, mounted on the roller axles 7.1, 7.2 |
| 9.1, 9.2 | rotatable roller bodies of the supporting rollers 4.1, 4.2 |
| 9.3 | rotatable roller body of the central supporting roller 4.3 |
| 10.1, 10.2 | holding elements for the shaft stubs 1, 2, mounted at the front wall 18 |
| 11 | conical end piece of the receiving shaft stub 1 |
| 12 | conical end piece of the moveable shaft stub 2 |
| 13 | hollow tube of the new supply reel 3.2 |
| 14 | horizontal carrying axle, carries the stationary or pivotal axles 7.1, 7.2 being parallel to the shifting direction SD |
| 15 | driven pulling roller for the web 20 |
| 16 | idler pulling roller for the web 20, biased against the driven pulling roller 15 |
| 17 | supporting roller frame, pivotal around axle 14 |
| 18 | front wall at which the holding elements 10.1, 10.2 are mounted |
| 19 | loading device frame, pivotal around axis PA1.h being perpendicular to the shifting direction SD |
| 20 | web of wrapping material pulled from the active supply reel 3.1 and moved in the direction W |
| α | angle between the center axis CA of the new supply reel 3.2 and the center axis of the receiving shaft stub 1 (only third embodiment) |

-continued

LIST OF REFERENCE SIGNS

| | |
|---|---|
| BD.1 | directions in which the roller body 9.1 can be shifted with respect to the roller axle 4.1 |
| BD.2 | directions in which the roller body 9.2 can be shifted with respect to the roller axle 4.2 |
| CA | center axis of the round-cylindrical supply reel 3 |
| d_min | minimal vertical distance between the circumferential surfaces of the supporting rollers 4.1, 4.2, . . . and a circumferential surface of the supply reel 3.1 held by the unrolling station 1, 2 |
| dist | distance between the circumferential surfaces 5.1, 5.2 and the reel center axis CA |
| ED | enlarging direction in which the moveable shaft stub 2 can be shifted away from the receiving shaft stub 1 |
| PA.h | horizontal pivoting axis of the receiving shaft stub 1 (only second embodiment) |
| PA1.h | horizontal pivoting axis for the roller frame 19 |
| PA.v | vertical pivoting axis of the receiving shaft stub 1 (only third embodiment) |
| OD | opposite direction in which the moveable shaft stub 2 can be shifted - opposite to the enlarging direction ED |
| r_max | maximal radius of the active supply reel 3.1 |
| RA.2 | rotating axis of the idler supporting roller 4.1 |
| RA.2 | rotating axis of the idler supporting roller 4.2 |
| RD | rotating direction of the active supply reel 3.1 |
| Rot. 1, Rot. 2 | rotating directions in which the supporting rollers 4.1, 4.2 are rotated when the supply reel 3.2 is shifted in the shifting direction SD |
| SD | shifting direction in which the supply reel 3.2 is shifted towards the receiving shaft stub 1 |
| TD | travelling direction of the baler |
| W | direction in which the pulling rollers 15, 16 move the web 20 |

The invention claimed is:

1. A wrapping device for use on an agricultural harvester, wherein the wrapping device comprises:
an unrolling station comprising a receiving unrolling station part and a further unrolling station part;
a web moving member; and
a loading device with at least one supporting roller, wherein the unrolling station is arranged to:
be operated in a holding mode in which the unrolling station holds a supply reel with wrapping material between the receiving unrolling station part and the further unrolling station part and enables a rotation of the supply reel around a reel center axis; and
be transferred into a releasing mode in which the receiving unrolling station part and the further unrolling station part release the supply reel and enable a removal of the supply reel,
wherein the reel center axis is horizontal when the supply reel is held between the receiving unrolling station part and the further unrolling station part,
wherein the web moving member is arranged to move a web of wrapping material taken from the supply reel held between the receiving unrolling station part and the further unrolling station part,
wherein the loading device is arranged to carry a further supply reel,
wherein the at least one supporting roller of the loading device is arranged:
to carry from below the further supply reel; and
to enable the shift of the further supply reel in a shifting direction towards the receiving part of the unrolling station,
wherein a respective roller rotating axis of the at least one supporting roller is positioned perpendicular to the shifting direction,
wherein the at least one supporting roller is positioned angularly below the unrolling station,
wherein in the holding mode there is a vertical distance between the at least one supporting roller and a supply reel held between the receiving unrolling station part and the further unrolling station part,
wherein the respective roller rotating axis of at least one supporting roller is mounted in a position or is transferable into a position between the receiving unrolling station part and the further unrolling station part;
wherein the at least one supporting roller comprises:
a rotatable roller body; and
a roller axle extending along the roller rotating axis, wherein the roller axle is stationary with respect to the unrolling station, and wherein the roller body is rotatable around the roller axle, and wherein the or each roller body can be shifted with respect to the corresponding roller axle in two opposing directions both being parallel to the roller rotating axis.

2. The wrapping device according to claim 1, wherein there is a gap between the or at least one supporting roller and the receiving unrolling station part and there is a further gap between the or at least one supporting roller and the further unrolling station part.

3. The wrapping device according to claim 1, wherein the loading device comprises a plurality of at least two supporting rollers, and
wherein the roller plurality is arranged to jointly carry from below the further supply reel.

4. The wrapping device according to claim 3, wherein there is a gap between two adjacent supporting rollers.

5. The wrapping device according to claim 1, wherein each of the at least one supporting roller has a concave circumferential surface positioned around the respective roller rotating axis.

6. The wrapping device according to claim 1, wherein the or at least one supporting roller comprises:
a free-wheel clutch, wherein the rotatable roller body is rotatably mounted on the roller axle, and wherein the free-wheel clutch enables a rotation of the rotatable roller body with respect to the roller axle in one direction, thereby enabling a shift in the shifting direction of the further supply reel being on each supporting roller with the free-wheel clutch, and inhibits a rotation of the rotatable roller body with respect to the roller axle in the opposite direction, thereby inhibiting a movement of the further supply reel in the opposite direction.

7. The wrapping device according to claim 1, wherein each of the at least one supporting rollers is pivotal around a respective roller pivoting axis of the respective supporting roller, and each said respective roller pivoting axis is perpendicular to the shifting direction.

8. The wrapping device according to claim 7, wherein each of the at least one supporting roller is mounted on a supporting roller frame which is pivotal around the roller pivoting axis,
 wherein each of the at least one supporting roller is mounted such that the respective roller rotating axis is stationary with respect to the supporting roller frame.

9. The wrapping device according to claim 7, wherein the roller pivoting axis is parallel to the or at least one roller rotating axis.

10. The wrapping device according to claim 7, wherein the roller pivoting axis is perpendicular to the or each roller rotating axis.

11. The wrapping device according to claim 1, wherein the wrapping device comprises at least two supporting rollers each comprising a circumferential surface, and in at least one operating position, the two supporting rollers are mounted in or transferrable into two different heights over ground,
 wherein the two supporting rollers are arranged to jointly carry from below the further supply reel in two contact areas of the two circumferential surfaces, and
 wherein the two contact areas define a plane which ascends seen in the shifting direction.

12. The wrapping device according to claim 1, wherein the receiving unrolling station part comprises a receiving holding member, and the further unrolling station part comprises a moveable holding member,
 wherein the moveable holding member is moveable with respect to the receiving holding member between a holding position and a remote position,
 wherein in the holding position the moveable holding member and the receiving holding member are arranged to jointly hold the supply reel with wrapping material and to enable a rotation of the supply reel, and
 wherein the shifting direction points towards the receiving holding member.

13. The wrapping device according to claim 12, wherein the receiving holding member is pivotal with respect to the movable holding member between a holding position and a receiving position, wherein in the holding position the moveable holding member and the receiving holding member are arranged to jointly hold the supply reel with wrapping material.

14. The wrapping device according to claim 13, wherein the receiving holding member is pivotal around a holding member pivoting axis between the holding position and the receiving position, wherein the holding member pivoting axis is perpendicular to the ground and/or perpendicular to the shifting direction.

15. The wrapping device according to claim 12, wherein the loading device comprises a further supporting roller,
 wherein the supporting roller is positioned adjacent to the receiving holding member,
 wherein the further supporting roller is positioned adjacent to the moveable holding member, and
 wherein in the receiving position the distance between the moveable holding member and the further supporting roller is larger than the distance between the receiving holding member and the supporting roller.

16. The wrapping device according to claim 1, wherein at least one unrolling station part comprises a conical end piece arranged for engaging into a hollow kernel of the supply reel.

17. The wrapping device according to claim 1, wherein the minimal distance between the reel center axis of the supply reel held between the receiving unrolling station part and the further unrolling station part and each of the at least one supporting roller is larger than the maximal radius of the further supply reel.

18. A bale forming and wrapping apparatus comprising:
 a bale forming chamber; and
 the wrapping device according to claim 1,
  wherein a horizontal wrapping material inlet guides into the bale forming chamber, and
  wherein the bale forming and wrapping apparatus is arranged to form a bale in the bale forming chamber, to inject a web of wrapping material supplied by the wrapping device through the horizontal wrapping material inlet into the bale forming chamber, and to wrap at least one surface of the bale in the bale forming chamber into the injected web.

19. An agricultural harvester comprising the bale forming and wrapping apparatus according to claim 18.

\* \* \* \* \*